US012571484B2

(12) United States Patent
Takeuchi et al.

(10) Patent No.: US 12,571,484 B2
(45) Date of Patent: Mar. 10, 2026

(54) VALVE DEVICE

(71) Applicant: AISIN CORPORATION, Kariya (JP)

(72) Inventors: Ryota Takeuchi, Kariya (JP); Yasuyuki Matsuo, Kariya (JP); Kyohei Hayakawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 31 days.

(21) Appl. No.: 18/439,819

(22) Filed: Feb. 13, 2024

(65) Prior Publication Data

US 2024/0309961 A1     Sep. 19, 2024

(30) Foreign Application Priority Data

Mar. 17, 2023    (JP) ................................. 2023-043162

(51) Int. Cl.
| | |
|---|---|
| *F16K 27/02* | (2006.01) |
| *B60N 2/90* | (2018.01) |
| *F16K 21/00* | (2006.01) |
| *F16K 31/06* | (2006.01) |

(52) U.S. Cl.
CPC ............ *F16K 27/029* (2013.01); *F16K 21/00* (2013.01); *F16K 31/06* (2013.01); *B60N 2/914* (2018.02)

(58) Field of Classification Search
CPC ........ B60N 2/665; B60N 2/914; B60N 2/976; F15B 13/07; F15B 13/0871; F16K 27/003
See application file for complete search history.

(56) References Cited

U.S. PATENT DOCUMENTS

| | | | |
|---|---|---|---|
| 9,080,581 | B2 | 7/2015 | Bocsanyi et al. |
| 2004/0089837 | A1* | 5/2004 | Bauer ................... F16K 27/003 |
| | | | 251/367 |
| 2009/0098407 | A1 | 4/2009 | Minegishi et al. |
| 2012/0143108 | A1* | 6/2012 | Bocsanyi ............... B60N 2/665 |
| | | | 297/284.3 |
| 2014/0232155 | A1* | 8/2014 | Bocsanyi ............... B60N 2/914 |
| | | | 297/284.6 |
| 2019/0093680 | A1* | 3/2019 | Kidokoro .............. F15B 21/005 |
| 2022/0080868 | A1* | 3/2022 | Kalmutzki .............. F16K 11/24 |
| 2025/0010779 | A1* | 1/2025 | Kang ................... F16K 31/0658 |

FOREIGN PATENT DOCUMENTS

JP          2009-97520 A      5/2009

* cited by examiner

*Primary Examiner* — Robert K Arundale
(74) *Attorney, Agent, or Firm* — Oblon, McClelland, Maier & Neustadt, L.L.P.

(57)          ABSTRACT

A valve device includes: a flow path member having a flow path; a plurality of solenoid valves configured to open and close the flow path; and a support member configured to support the plurality of solenoid valves from below in an up-down direction and be stacked with the flow path member in the up-down direction. When a part located at an uppermost position in the up-down direction of each of the solenoid valves is defined as an uppermost portion, the flow path is located to be shifted from the uppermost portions of the plurality of solenoid valves in a direction perpendicular to the up-down direction.

13 Claims, 15 Drawing Sheets

VALVE DEVICE

CROSS REFERENCE TO RELATED APPLICATIONS

This application is based on and claims priority under 35 U.S.C. § 119 to Japanese Patent Application 2023-043162, filed on Mar. 17, 2023, the entire content of which is incorporated herein by reference.

TECHNICAL FIELD

This disclosure relates to a valve device.

BACKGROUND DISCUSSION

JP 2009-97520A (Reference 1) discloses a valve device including a structure having a flow path and a plurality of electromagnetic valves mounted on the structure. The structure has a plurality of blocks each having a hole and a groove. The flow path of the structure is formed by stacking a plurality of blocks such that holes and grooves of the plurality of blocks are connected. The plurality of electromagnetic valves are mounted above the structure so as to open and close different portions of the flow path.

In the valve device as described above, since the plurality of blocks and the plurality of electromagnetic valves are aligned in an up-down direction, the thickness in the up-down direction tends to be large. Therefore, the valve device as described above is not suitable for being disposed in a flat space.

SUMMARY

Aspect 1

According to an aspect of this disclosure, a valve device includes: a flow path member having a flow path; a plurality of solenoid valves configured to open and close the flow path; and a support member configured to support the plurality of solenoid valves from below in an up-down direction and be stacked with the flow path member in the up-down direction. When a part located at an uppermost position in the up-down direction of each of the solenoid valves is defined as an uppermost portion, the flow path is located to be shifted from the uppermost portions of the plurality of solenoid valves in a direction perpendicular to the up-down direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a seat including a valve device will be described.

Configuration of Embodiment

Figure 1:
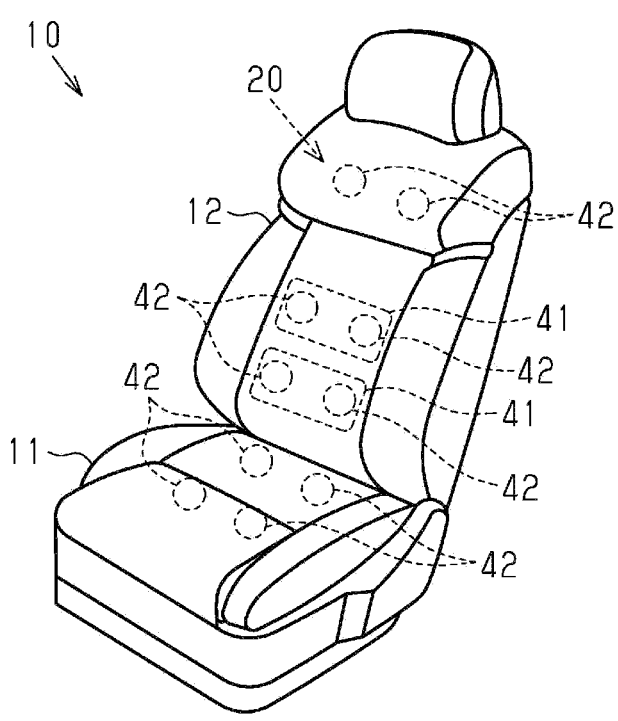
FIG. 1 is a perspective view of a seat.

As shown in FIG. 1, a seat 10 includes a seat cushion 11, a seat back 12, and a pneumatic system 20. The seat 10 corresponds to, for example, a driver seat, a passenger seat, and a back seat of a vehicle.

Seat Cushion 11 and Seat Back 12

As shown in FIG. 1, the seat cushion 11 supports the buttocks and thighs of a user. The seat back 12 supports the back of the user. The seat cushion 11 includes a seat frame forming a framework, a cushion spring supported by the seat frame, a cushion pad attached to the cushion spring, and a cover covering the cushion pad, which are not shown. The same applies to the seat back 12.

Pneumatic System 20

Figure 2:
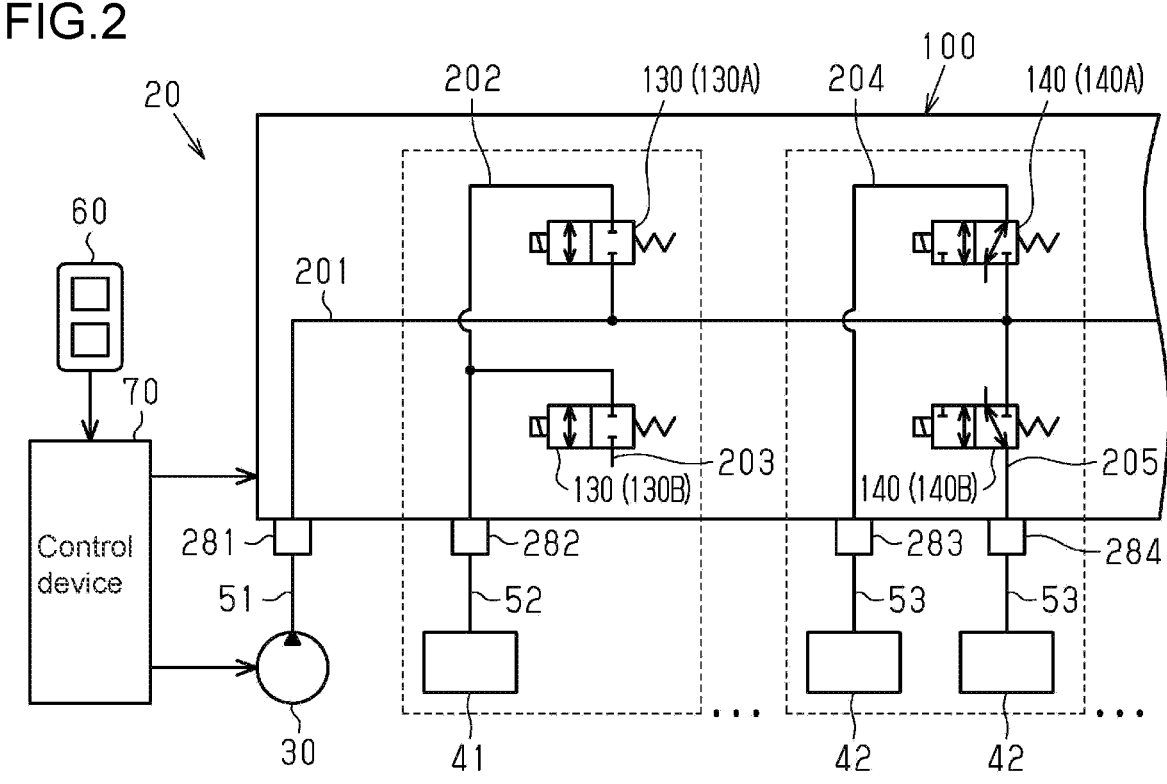
FIG. 2 is a schematic diagram showing a schematic configuration of a pneumatic system.

As shown in FIGS. 1 and 2, the pneumatic system 20 includes a pump 30, a plurality of first air bags 41, a plurality of second air bags 42, a plurality of tubes 51 to 53, an operation unit 60, a control device 70, and a valve device 100.

Pump 30

The pump 30 may be an electric pump using an electric motor as a drive source. In the pump 30, an electric motor is driven based on electric power supplied from an in-vehicle battery. The pump 30 sends out air toward the valve device 100. An air supply tube 51 is connected to the pump 30.

First Air Bag 41

As shown in FIG. 1, in the embodiment, the plurality of first air bags 41 are two first air bags 41. The two first air bags 41 are disposed in a lower portion of the seat back 12. The two first air bags 41 are aligned in a longitudinal direction of the seat back 12. The first air bags 41 are support air bags for supporting the waist of the user. The first air bag 41 supports the waist of the user by maintaining the state of expanding to a size desired by the user.

As shown in FIG. 2, each of a plurality of first connection tubes 52 is connected to a respective one of the two first air bags 41. In FIG. 2, " . . . " adjacent to a rectangular frame with a two-dot chain line surrounding the first air bag 41 indicates that there are a plurality of (two) configurations in the rectangular frame with the two-dot chain line. The number of the first air bags 41 can be changed as appropriate.

Second Air Bag 42

As shown in FIG. 1, in the embodiment, the plurality of second air bags 42 are ten second air bags 42. The ten second air bags 42 are disposed in the seat cushion 11 and the seat back 12. Specifically, four second air bags 42 are disposed in the seat cushion 11, and six second air bags 42 are disposed in the seat back 12. The second air bags 42 are massage air bags for massaging the thighs, the buttocks, and the back of the user. In a thickness direction of the seat back 12, the four second air bags 42 overlapping the two first air bags 41 are located closer to the covering of the seat back 12 than the two first air bags 41.

As shown in FIG. 2, each of a plurality of second connection tubes 53 is connected to a respective one of the ten second air bags 42. In FIG. 2, " . . . " adjacent to a rectangular frame with a two-dot chain line surrounding the second air bags 42 indicates that there are a plurality of (five) configurations in the rectangular frame with the two-dot chain line. The number of the second air bags 42 can be changed as appropriate.

Valve Device 100

Figure 3:
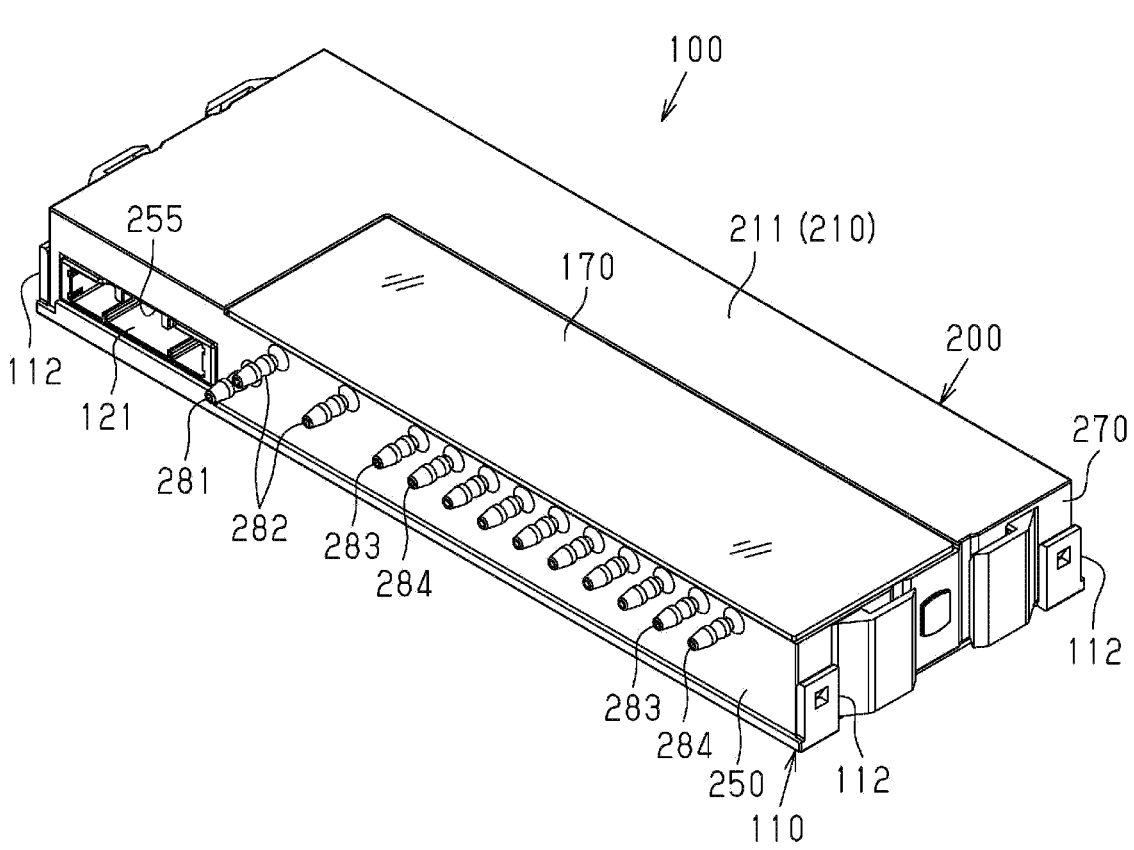
FIG. 3 is a perspective view of a valve device.
Figure 3:
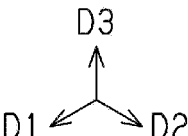

As shown in FIG. 3, the valve device 100 has a rectangular parallelepiped shape. In the following description, a short-side direction of the valve device 100 in a plan view is referred to as a first direction D1, a longitudinal direction thereof in the plan view is referred to as a second direction D2, and a direction perpendicular to both the first direction D1 and the second direction D2 is referred to as an up-down direction D3. The first direction D1, the second direction D2, and the up-down direction D3 are perpendicular to one another. The up-down direction D3 is also a thickness direction of the valve device 100.

Figure 4:
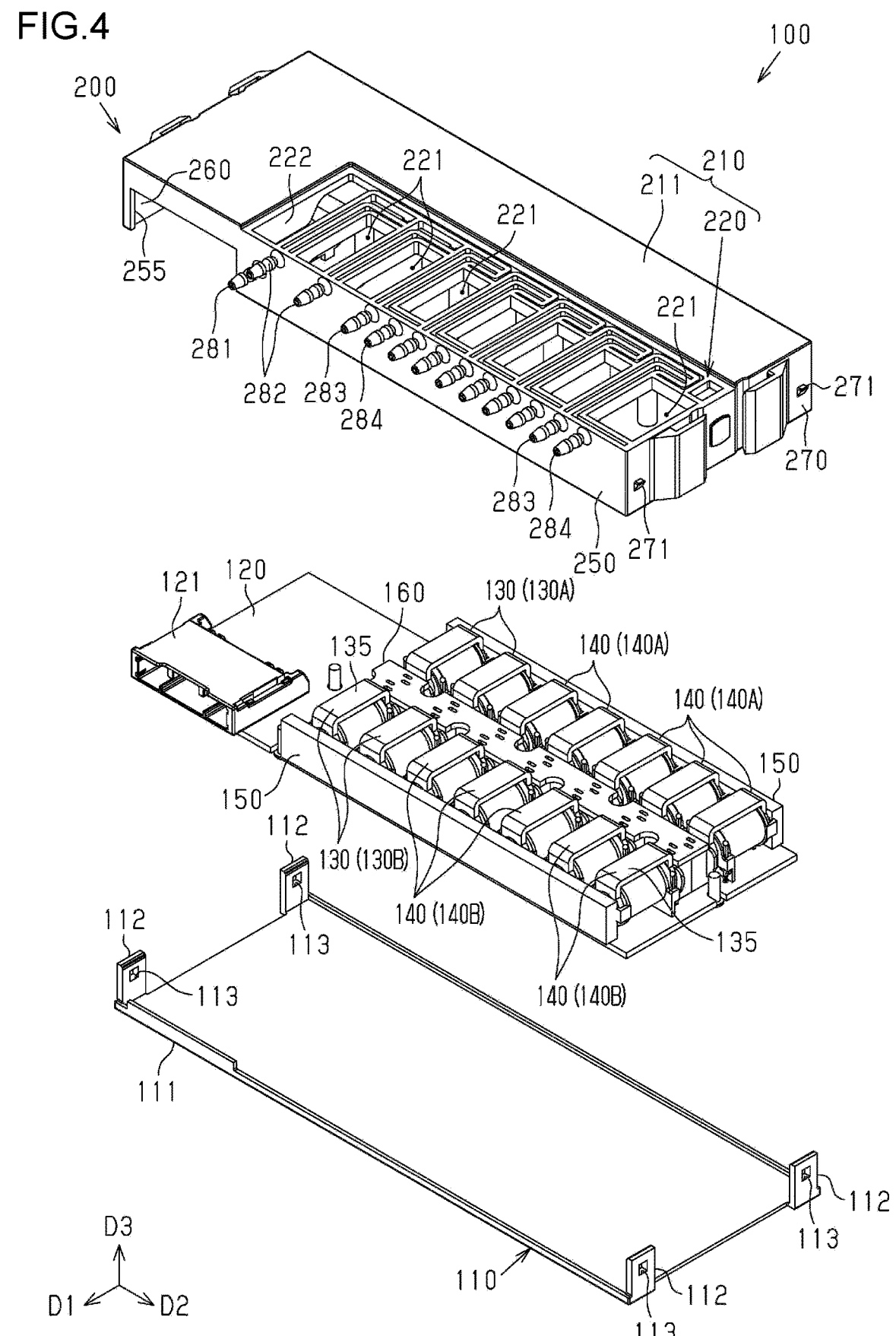
FIG. 4 is an exploded perspective view of the valve device.
Figure 5:
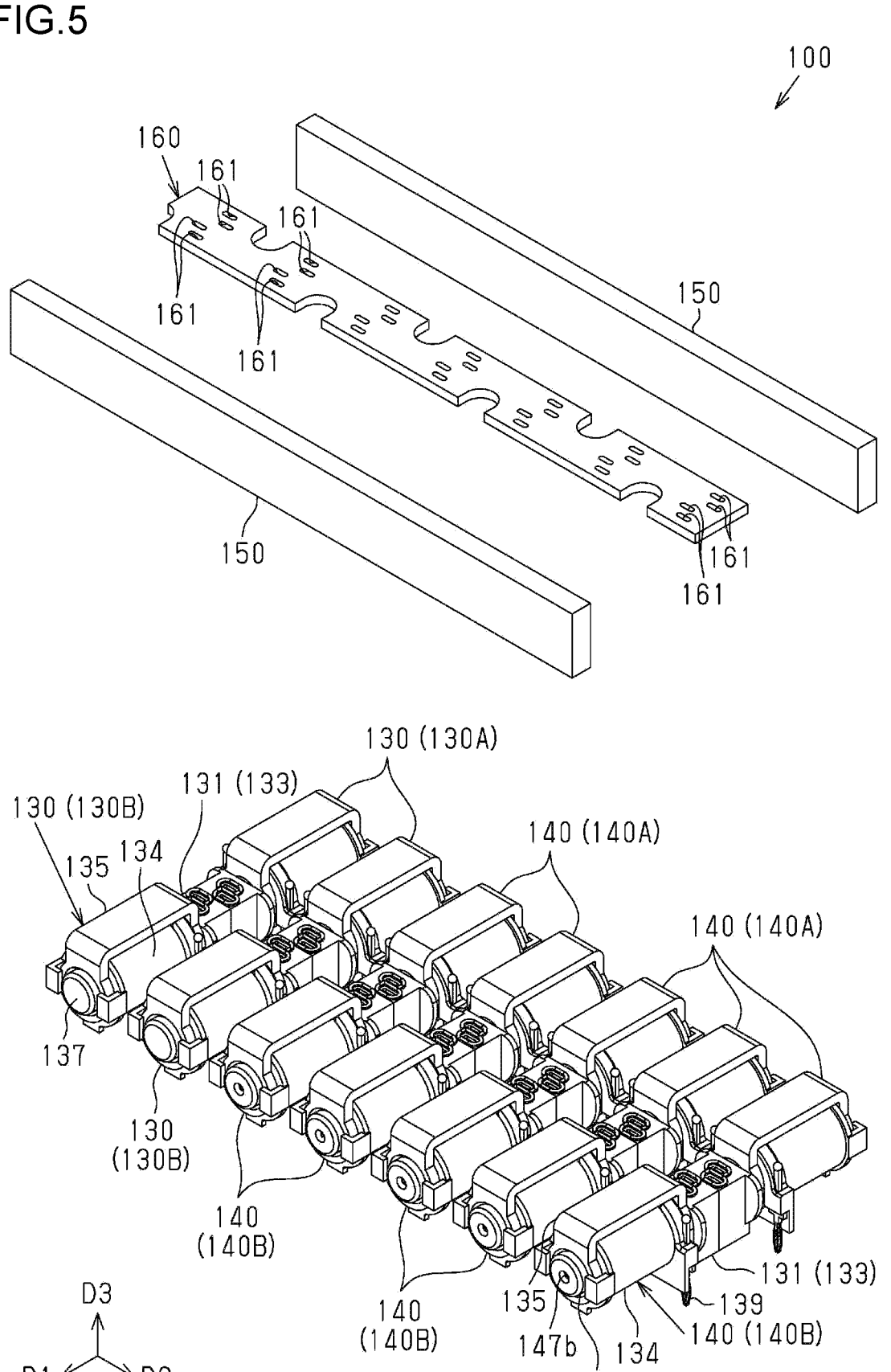
FIG. 5 is an exploded perspective view of the valve device.

As shown in FIGS. 3 to 5, the valve device 100 includes a bottom cover 110, a substrate 120, a plurality of first valves 130, a plurality of second valves 140, a plurality of sound absorbing members 150, an intermediate member 160, a first flow path member 200, and a second flow path member 170.

Bottom Cover 110

As shown in FIG. 4, the bottom cover 110 includes a bottom wall 111 and four erected walls 112. The bottom wall 111 has a rectangular plate shape whose plate thickness direction is the up-down direction D3. In a plan view in the up-down direction D3, a short side of the bottom wall 111 extends in the first direction D1, and a long side of the bottom wall 111 extends in the second direction D2. The four erected walls 112 extend upward from four corners of the bottom wall 111, which are located on short sides of the bottom wall 111. A plate thickness direction of the erected wall 112 is the second direction D2. The erected wall 112 has a locking hole 113 penetrating in the second direction D2. The bottom cover 110 covers a lower side of the valve device 100.

Substrate 120

The substrate 120 has a rectangular plate shape similar to the bottom wall 111 of the bottom cover 110. A connector 121 is provided on an upper surface of the substrate 120. An end portion of a harness in which signal lines and power supply lines are combined is connected to the connector 121.

First Valve 130

Figure 6:
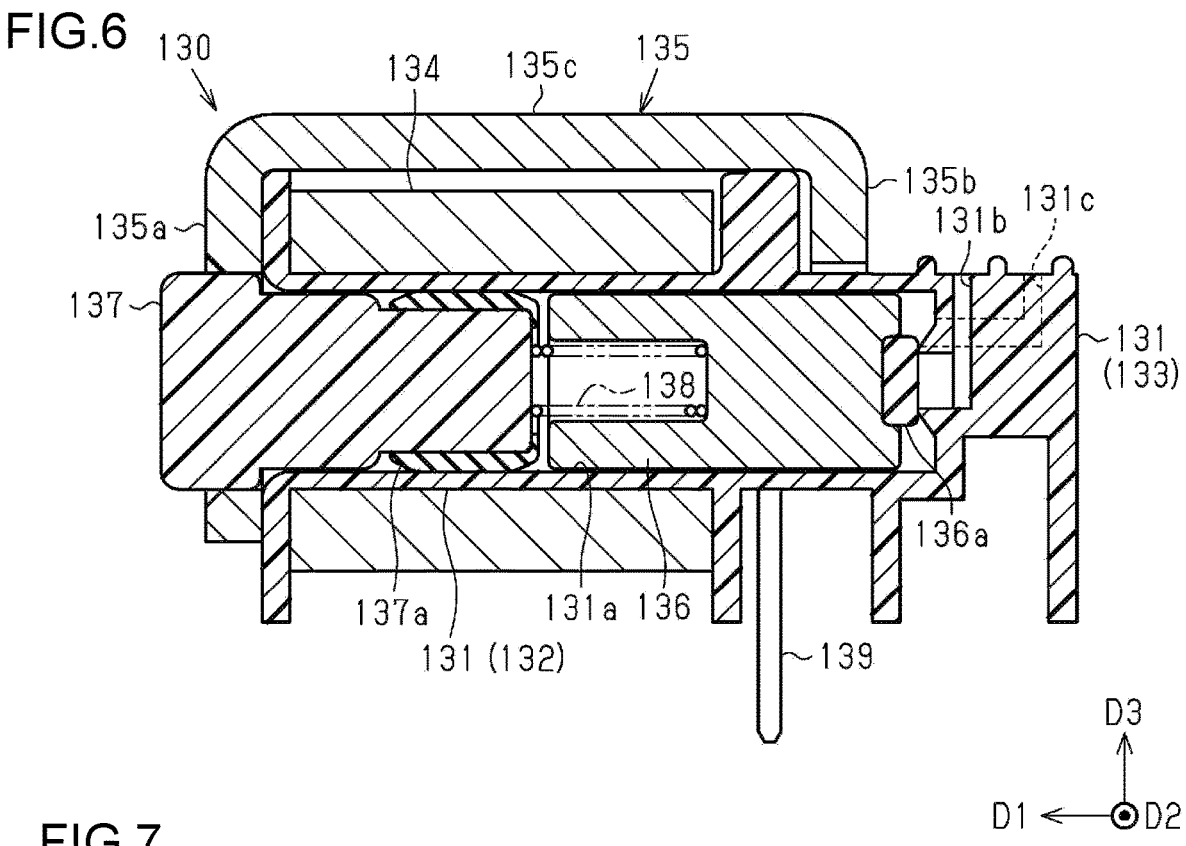
FIG. 6 is a cross-sectional view of a first valve.

As shown in FIG. 2, the plurality of first valves 130 are two-port solenoid valves. As shown in FIG. 6, the first valve 130 includes a holder 131, a coil 134, a yoke 135, a plunger 136, a cap 137, a coil spring 138, and two terminals 139.

The holder 131 is formed of a resin material. The holder 131 includes a bobbin 132 and a connection portion 133. The holder 131 has an internal space 131a, a first connection flow path 131b, and a second connection flow path 131c. A winding wire forming the coil 134 is wound around the bobbin 132. The connection portion 133 is connected to the bobbin 132 in an axial direction of the bobbin 132. The internal space 131a is a cylindrical space provided across an inside of the bobbin 132 and an inside of the connection portion 133. An axial direction of the internal space 131a matches the axial direction of the bobbin 132. The first connection flow path 131b and the second connection flow path 131c are provided inside the connection portion 133. A first end of the first connection flow path 131b and a first end of the second connection flow path 131c are opened in a surface facing upward of the connection portion 133. A second end of the first connection flow path 131b and a second end of the second connection flow path 131c are opened in a surface facing the internal space 131a. An opening of the first connection flow path 131b in the internal space 131a is located on a central axis of the internal space 131a. An opening of the second connection flow path 131c in the internal space 131a is located to be shifted from the central axis of the internal space 131a.

The yoke 135 is made of a magnetic material. The yoke 135 includes a first end portion 135a, a second end portion 135b, and a connection wall 135c. The first end portion 135a and the second end portion 135b each have a plate shape whose plate thickness direction is an axial direction of the coil 134. The connection wall 135c has a plate shape whose plate thickness direction is a radial direction of the coil 134. The connection wall 135c connects the first end portion 135a and the second end portion 135b in the axial direction of the coil 134. The yoke 135 is fixed to the holder 131. At this time, the first end portion 135a and the second end portion 135b of the yoke 135 are located on both sides in the axial direction of the coil 134, respectively.

The plunger 136 is made of a magnetic material. The plunger 136 has a cylindrical shape. An outer diameter of the plunger 136 is smaller than an inner diameter of the internal space 131a of the holder 131. The plunger 136 includes a valve body 136a on one end portion in the axial direction. The plunger 136 is accommodated in the internal space 131a of the holder 131. At this time, the valve body 136a of the plunger 136 faces an opening of the first connection flow path 131b in the axial direction of the internal space 131a. The plunger 136 is movable in the axial direction in the internal space 131a. The cap 137 has a cylindrical shape. The cap 137 includes a seal 137a on one end portion in the axial direction of the cap 137. The seal 137a covers a part of a side surface of the cap 137 and a part of a distal end surface of the cap 137. The cap 137 is inserted into the internal space 131a of the holder 131 in a state in which the seal 137a faces the plunger 136. Unlike the plunger 136, the cap 137 is immovably fixed to the holder 131. The coil spring 138 is accommodated in the internal space 131a of the holder 131. The coil spring 138 is compressed between the plunger 136 and the cap 137 in the internal space 131a of the holder 131. Therefore, the coil spring 138 biases the plunger 136 toward the connection portion 133. The two terminals 139 are respectively connected to both ends of the winding wire constituting the coil 134. The two terminals 139 extend downward from the bobbin 132.

As shown in FIG. 6, when power is not supplied to the first valve 130, the plunger 136 is pressed against the connection portion 133 by a biasing force of the coil spring 138. That is, the valve body 136a of the plunger 136 closes the opening of the first connection flow path 131b. Therefore, when power is not supplied to the first valve 130, the first valve 130 is in a cutoff state in which the first connection flow path 131b is not connected to the second connection flow path 131c. In contrast, when power is supplied to the first valve 130, the plunger 136 moves in a direction away from the connection portion 133. That is, the valve body 136a of the plunger 136 does not close the opening of the first connection flow path 131b. Therefore, when power is supplied to the first valve 130, the first valve 130 is in a connection state in which the first connection flow path 131b is connected to the second connection flow path 131c.

Second Valve 140

Figure 7:
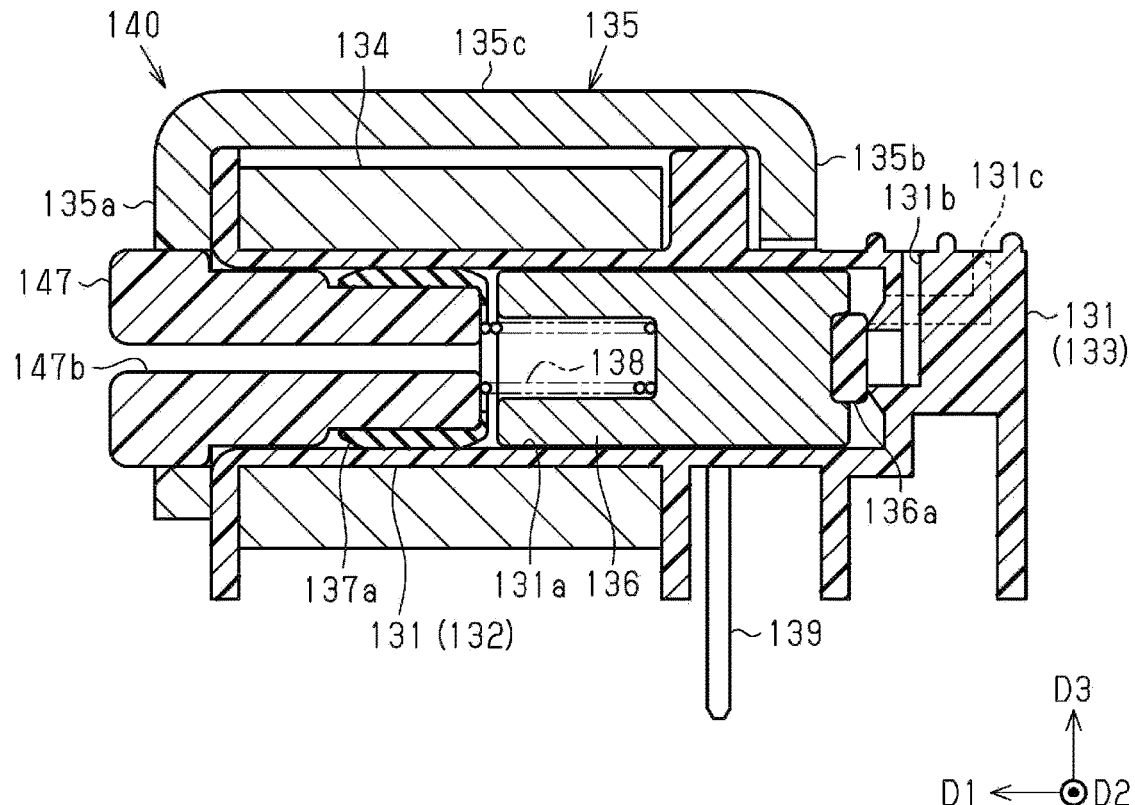
FIG. 7 is a cross-sectional view of a second valve.

As shown in FIG. 2, the plurality of second valves 140 are three-port solenoid valves. As shown in FIG. 7, the second valve 140 includes the holder 131, the coil 134, the yoke 135, the plunger 136, a cap 147, the coil spring 138, and the two terminals 139. As shown in FIGS. 6 and 7, a structure of the cap 147 of the second valve 140 is slightly different as compared with the first valve 130. Specifically, as shown in FIG. 7, the cap 147 of the second valve 140 has an atmosphere communication path 147b penetrating in the axial direction. A first end of the atmosphere communication path 147b is opened in a surface facing the internal space 131a of the holder 131, and a second end of the atmosphere communication path 147b is opened in a surface facing the outside.

As shown in FIG. 7, when power is not supplied to the second valve 140, the plunger 136 is pressed against the connection portion 133 by the biasing force of the coil spring 138. That is, the plunger 136 closes the opening of the first connection flow path 131b, but does not close an opening of the atmosphere communication path 147b. Therefore, when power is not supplied to the second valve 140, the second valve 140 is in an exhaustion state in which the second connection flow path 131c is connected to the atmosphere communication path 147b among the first connection flow path 131b, the second connection flow path 131c, and the atmosphere communication path 147b. At this time, the second connection flow path 131c is connected to the atmosphere communication path 147b via a gap between the holder 131 and the plunger 136. On the other hand, when power is supplied to the second valve 140, the plunger 136 moves in a direction away from the connection portion 133. That is, while the valve body 136a of the plunger 136 does not close the opening of the first connection flow path 131b, the plunger 136 closes the opening of the atmosphere communication path 147b. Therefore, when power is supplied to the second valve 140, the second valve 140 is in an air supply state in which the first connection flow path 131b is connected to the second connection flow path 131c among the first connection flow path 131b, the second connection flow path 131c, and the atmosphere communication path 147b.

Sound Absorbing Member 150

As shown in FIG. 5, the sound absorbing member 150 has a rectangular plate shape whose plate thickness direction is the first direction D1. In a side view in the first direction D1, a long side of the sound absorbing member 150 extends in the second direction D2, and a short side of the sound absorbing member 150 extends in the up-down direction D3. The sound absorbing member 150 is made of a porous material such as urethane sponge.

Intermediate Member 160

As shown in FIG. 5, the intermediate member 160 has a rectangular plate shape whose plate thickness direction is the up-down direction D3. In a plan view in the up-down direction D3, a short side of the intermediate member 160 extends in the first direction D1, and a long side of the intermediate member 160 extends in the second direction D2. The intermediate member 160 may be made of, for example, an elastomer such as rubber or resin. That is, the intermediate member 160 preferably has appropriate elasticity.

The intermediate member 160 has a plurality of communication holes 161 penetrating in the plate thickness direction. The plurality of communication holes 161 are aligned in the first direction D1 and in the second direction D2. Specifically, four communication holes 161 are aligned in the first direction D1, and seven communication holes 161 are aligned in the second direction D2. The four communication holes 161 aligned in the first direction D1 are aligned in a zigzag manner, and the seven communication holes 161 aligned in the second direction D2 are aligned in a straight line. Two communication holes 161 are provided for one first valve 130 or one second valve 140. That is, the number of the communication holes 161 is "28", which is twice the total number of the first valve 130 and the second valve 140.

First Flow Path Member 200

Figure 8:
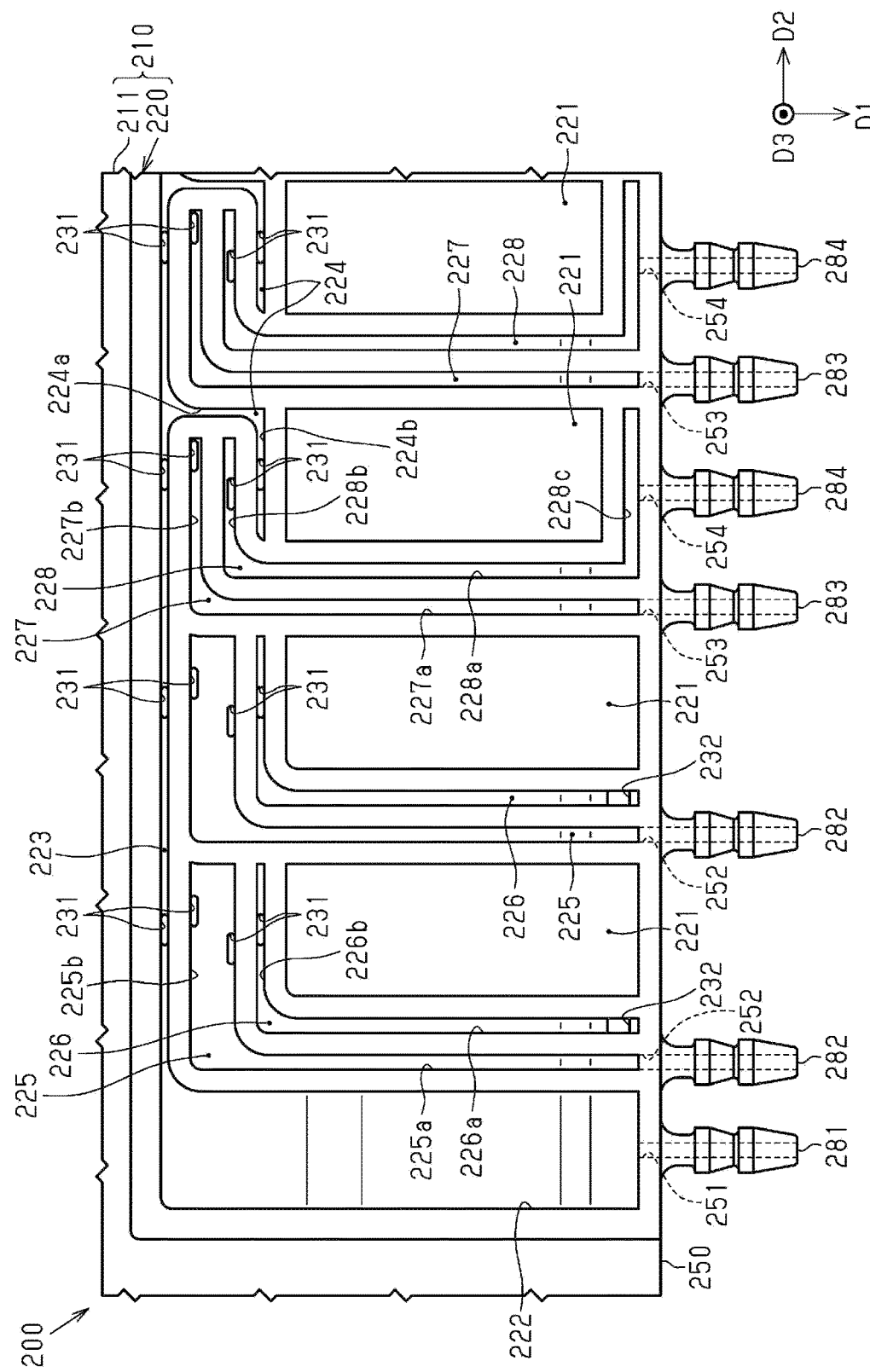
FIG. 8 is a partial plan view of a first flow path member.
Figure 9:
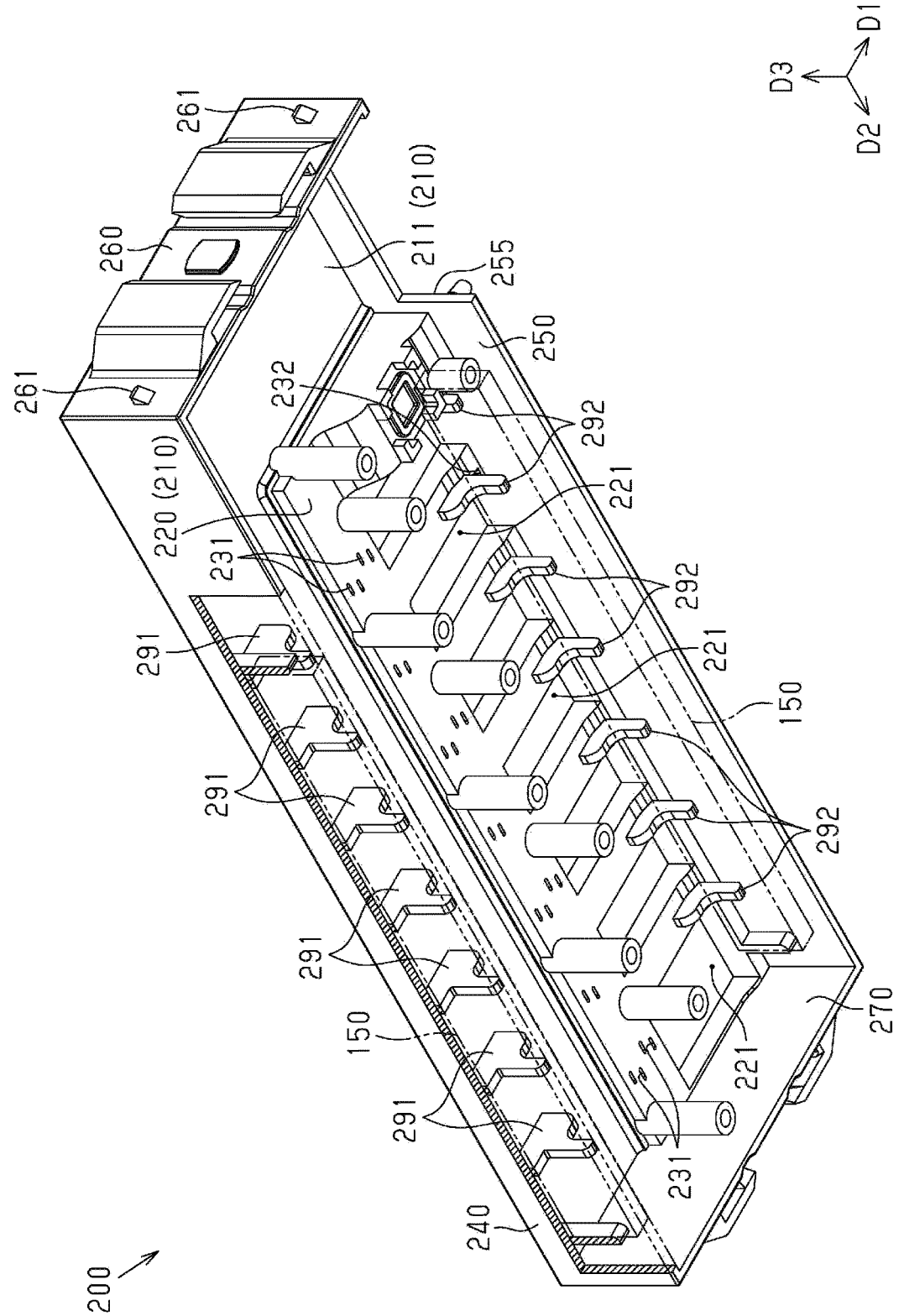
FIG. 9 is a perspective view of the first flow path member.

As shown in FIGS. 4, 8, and 9, the first flow path member 200 includes an upper wall 210, first side walls 240 and 250, second side walls 260 and 270, a plurality of nozzles 281 to 284, and a plurality of support ribs 291 and 292. The first flow path member 200 is preferably formed of, for example, a non-transparent resin material. Specifically, a material of the first flow path member 200 preferably has a high absorptivity with respect to a wavelength of laser light used in laser processing machine.

Upper Wall 210 of First Flow Path Member 200

As shown in FIG. 4, the upper wall 210 has a rectangular plate shape whose plate thickness direction is the up-down direction D3. In a plan view in the up-down direction D3, a short side of the upper wall 210 extends in the first direction D1, and a long side of the upper wall 210 extends in the second direction D2. The upper wall 210 includes a first upper wall 211 and a second upper wall 220. The first upper wall 211 has an L shape in a plan view in the up-down direction D3. The first upper wall 211 is connected to the first side walls 240 and 250 and the second side walls 260 and 270. The second upper wall 220 has a rectangular shape in a plan view in the up-down direction D3. In a plan view in the up-down direction D3, a short side of the second upper wall 220 extends in the first direction D1, and a long side of the second upper wall 220 extends in the second direction D2. The second upper wall 220 is connected to the first side wall 250 and the second side wall 270.

As shown in FIG. 8, the second upper wall 220 includes a plurality of exposure holes 221, a recessed portion 222, a main groove 223, a plurality of sub grooves 224, a plurality of first air supply grooves 225, a plurality of first exhaust grooves 226, a plurality of second air supply grooves 227, and a plurality of second air supply grooves 228. The second upper wall 220 further includes a plurality of communication holes 231 and a plurality of exhaust holes 232.

The exposure hole 221 has a rectangular shape in a plan view in the up-down direction D3. In a plan view in the up-down direction D3, a long side of the exposure hole 221 extends in the first direction D1, and a short side of the exposure hole 221 extends in the second direction D2. The exposure hole 221 may have a shape corresponding to the first valve 130 and the second valve 140. The plurality of exposure holes 221 are aligned at intervals in the second direction D2. The number of the exposure holes 221 is "7" which is half of the total number of the first valves 130 and the second valves 140.

The recessed portion 222 corresponds to a "recessed groove" recessed downward. In a plan view in the up-down direction D3, the recessed portion 222 has a rectangular shape whose longitudinal direction is the first direction D1 and whose short-side direction is the second direction D2. A bottom surface of the recessed portion 222 is inclined downward as the bottom surface approaches the first side wall 250 in the first direction D1. That is, a part of the bottom surface of the recessed portion 222 near the first side wall 250 is lower than a part of the bottom surface of the recessed portion 222 far from the first side wall 250.

The main groove 223 corresponds to a "recessed groove" recessed downward. The main groove 223 extends from the recessed portion 222 in the second direction D2. More specifically, the main groove 223 extends from an end portion of the recessed portion 222 far from the first side wall 250 toward the second side wall 270. The plurality of communication holes 231 penetrating the second upper wall 220 in the up-down direction D3 are opened in the bottom surface of the main groove 223. The communication holes 231 opened in the bottom surface of the main groove 223 are located at intervals in the second direction D2. The number of the communication holes 231 opened in the bottom surface of the main groove 223 is "7" which is half of the total number of the first valves 130 and the second valves 140.

The plurality of sub grooves 224 correspond to "recessed grooves" recessed downward. The plurality of sub grooves 224 are branched from the main groove 223. That is, the plurality of sub grooves 224 are connected to the main groove 223. The sub groove 224 includes a first part 224a extending in the first direction D1 from the main groove 223 and a second part 224b extending in the second direction D2 from the first part 224a. The communication hole 231 penetrating the second upper wall 220 in the up-down direction D3 is opened in the bottom surface of the second part 224b of the sub groove 224. The number of the sub grooves 224 is "5" which is half of the total number of the second valves 140.

The plurality of first air supply grooves 225 and the plurality of first exhaust grooves 226 correspond to "recessed grooves" recessed downward. In a plan view in the up-down direction D3, the plurality of first air supply grooves 225 and the plurality of first exhaust grooves 226 are not connected to the main groove 223 and the sub groove 224. That is, each of the plurality of first air supply grooves 225 is an independent groove that is not connected to other grooves, and each of the plurality of first exhaust grooves 226 is an independent groove that is not connected to other grooves.

The first air supply groove 225 includes a first part 225a extending in the first direction D1 and a second part 225b extending in the second direction D2 from the first part 225a. A first end of the first part 225a of the first air supply groove 225 extends to the first side wall 250. Meanwhile, a second end of the first part 225a of the first air supply groove 225 is connected to the second part 225b of the first air supply groove 225. Two communication holes 231 penetrating the second upper wall 220 in the up-down direction D3 are opened in a bottom surface of the second part 225b of the first air supply groove 225. The two communication holes 231 are located to be shifted from each other in the first direction D1 and the second direction D2. The number of the first air supply grooves 225 is "2" which is half of the total number of the first valves 130.

The first exhaust groove 226 includes a first part 226a extending in the first direction D1 and a second part 226b extending in the second direction D2 from the first part 226a. A first end of the first part 226a of the first exhaust groove 226 extends to the first side wall 250. Meanwhile, a second end of the first part 226a of the first exhaust groove 226 is connected to the second part 226b of the first exhaust groove 226. The first part 226a of the first exhaust groove

226 is located between the first part 225a of the first air supply groove 225 and the exposure hole 221 in the second direction D2. The second part 226b of the first exhaust groove 226 is located between the second part 225b of the first air supply groove 225 and the exposure hole 221 in the first direction D1. An exhaust hole 232 penetrating the second upper wall 220 in the up-down direction D3 is opened in a bottom surface of the first part 226a of the first exhaust groove 226. The exhaust hole 232 is located near the first side wall 250 in the first part 226a of the first exhaust groove 226. The communication hole 231 penetrating the second upper wall 220 in the up-down direction D3 is opened in a bottom surface of the second part 226b of the first exhaust groove 226. The number of the first exhaust grooves 226 is "2" which is half of the total number of the first valves 130.

A bottom surface of the first part 225a of the first air supply groove 225 and the bottom surface of the first part 226a of the first exhaust groove 226 are inclined downward as the bottom surfaces approach the first side wall 250 in the first direction D1. In other words, parts of the bottom surfaces of the two near the first side wall 250 are lower than parts of the bottom surfaces of the two far from the first side wall 250. In the embodiment, the parts of the bottom surfaces of the two near the first side wall 250 are inclined.

The plurality of second air supply grooves 227 and 228 correspond to "recessed grooves" recessed downward. In a plan view in the up-down direction D3, the plurality of second air supply grooves 227 and 228 are not connected to the main groove 223 and the sub grooves 224. That is, each of the plurality of second air supply grooves 227 and 228 is an independent groove that is not connected to other grooves.

The second air supply groove 227 includes a first part 227a extending in the first direction D1 and a second part 227b extending in the second direction D2 from the first part 227a. A first end of the first part 227a of the second air supply groove 227 extends to the first side wall 250. Meanwhile, a second end of the first part 227a of the second air supply groove 227 is connected to the second part 227b of the second air supply groove 227. The communication hole 231 penetrating the second upper wall 220 in the up-down direction D3 is opened in a bottom surface of the second part 227b of the second air supply groove 227. The number of the second air supply grooves 227 is "5" which is half of the total number of the second valves 140.

The second air supply groove 228 includes a first part 228a extending in the first direction D1 and second parts 228b and 228c extending in the second direction D2 from the first part 228a. A first end of the first part 228a of the second air supply groove 228 extends to the first side wall 250. The first end of the first part 228a of the second air supply groove 228 is connected to the second part 228c. Meanwhile, a second end of the first part 228a of the second air supply groove 228 is connected to the second part 228b. The first part 228a of the second air supply groove 228 is located between the first part 227a of the second air supply groove 227 and the exposure hole 221 in the second direction D2. The second part 228b of the second air supply groove 228 is located between the second part 227b of the second air supply groove 227 and the second part 224b of the sub groove 224 in the first direction D1. The second part 228c of the second air supply groove 228 is located between the first side wall 250 and the exposure hole 221 in the first direction D1. The communication hole 231 penetrating the second upper wall 220 in the up-down direction D3 is opened in a bottom surface of the second part 228b of the second air supply groove 228. The number of the second air supply grooves 228 is "5" which is half of the total number of the second valves 140.

A bottom surface of the first part 227a of the second air supply groove 227 and a bottom surface of the first part 228a of the second air supply groove 228 are inclined downward as the bottom surfaces approach the first side wall 250 in the first direction D1. In other words, parts of the bottom surfaces of the two near the first side wall 250 are lower than parts of the bottom surfaces of the two far from the first side wall 250. The second part 228c of the second air supply groove 228 extends from a part of the first part 228a of the second air supply groove 228 near the first side wall 250, and therefore, a bottom surface of the second part 228c of the second air supply groove 228 also becomes low. In the embodiment, the bottom surface of the first part 227a of the second air supply groove 227 and the bottom surface of the first part 228a of the second air supply groove 228 are inclined at a part near the first side wall 250.

Regarding the main groove 223, the plurality of sub grooves 224, the first parts 225a of the plurality of first air supply grooves 225, the plurality of first exhaust grooves 226, and the plurality of second air supply grooves 227 and 228, the groove width is smaller than the groove depth. That is, a cross-sectional shape perpendicular to an extending direction of each of these grooves is a rectangular shape whose longitudinal direction is the up-down direction D3 and whose short-side direction is a direction perpendicular to the up-down direction D3.

Sidewall of First Flow Path Member 200

As shown in FIGS. 4 and 9, the first side walls 240 and 250 have a rectangular plate shape whose plate thickness direction is the first direction D1. In a side view in the first direction D1, a length of each of the long sides of the first side walls 240 and 250 is equal to a length of the long side of the upper wall 210. As shown in FIGS. 8 and 9, the first side wall 250 includes a plurality of connection holes 251 to 254 and an opening 255 from which the connector 121 is exposed. As shown in FIG. 8, the plurality of connection holes 251 to 254 penetrate the first side wall 250 in the plate thickness direction. The connection hole 251 is connected to the recessed portion 222. The connection hole 252 is connected to the first air supply groove 225. The connection hole 253 is connected to the second air supply groove 227, and the connection hole 254 is connected to the second air supply groove 228.

As shown in FIGS. 4 and 9, the second side walls 260 and 270 have a rectangular plate shape whose plate thickness direction is the second direction D2. In a side view in the second direction D2, a length of each of long sides of the second side walls 260 and 270 is equal to a length of a short side of the upper wall 210. As shown in FIG. 9, the second side wall 260 includes two locking portions 261 extending from an outer surface of the second side wall 260. Similarly, as shown in FIG. 4, the second side wall 270 includes two locking portions 271 extending from an outer surface of the second side wall 270. The two locking portions 261 and the two locking portions 271 are located at an interval in the first direction D1. The locking portions 261 and 271 have shapes corresponding to the locking holes 113 of the bottom cover 110.

Nozzles 281 to 284 of First Flow Path Member 200

As shown in FIG. 8, the plurality of nozzles 281 to 284 include an air supply nozzle 281, a plurality of first connection nozzles 282, and a plurality of second connection nozzles 283 and 284. The plurality of nozzles 281 to 284 each have a tubular shape. The plurality of nozzles 281 to 284 extend in the first direction D1 from an outer surface of the first side wall 250.

The air supply nozzle 281 is adjacent to the recessed portion 222 in the first direction D1 with the first side wall 250 interposed therebetween. The air supply nozzle 281 is connected to the recessed portion 222 via the connection hole 251. Each of the plurality of first connection nozzles 282 is adjacent to a respective one of the plurality of first air supply grooves 225 in the first direction D1 with the first side wall 250 interposed therebetween. Each of the plurality of first connection nozzles 282 is connected to a respective one of the plurality of first air supply grooves 225 via a respective one of a plurality of connection holes 252. The plurality of second connection nozzles 283 and 284 are adjacent to the plurality of second air supply grooves 227 and 228 respectively in the first direction D1 with the first side wall 250 interposed therebetween. Each of the plurality of second connection nozzles 283 is connected to a respective one of the plurality of second air supply grooves 227 via a respective one of a plurality of connection holes 253. Each of the plurality of second connection nozzles 284 is connected to a respective one of the plurality of second air supply grooves 228 via a respective one of the plurality of connection holes 254. The air supply nozzle 281 corresponds to a "supply nozzle".

Support Ribs 291 and 292 of First Flow Path Member 200

As shown in FIG. 9, the plurality of support ribs 291 extend downward from the upper wall 210 near the first side wall 240. The plurality of support ribs 291 are aligned in the second direction D2. In the first direction D1, a gap is present between the plurality of support ribs 291 and the first side wall 240. Similarly, the plurality of support ribs 292 extend downward from the upper wall 210 near the first side wall 250. The plurality of support ribs 292 are aligned in the second direction D2. In the first direction D1, a gap is present between the plurality of support ribs 292 and the first side wall 250.

Second Flow Path Member 170

As shown in FIG. 3, the second flow path member 170 has a rectangular plate shape whose plate thickness direction is the up-down direction D3. That is, a shape of the second flow path member 170 corresponds to a shape of the second upper wall 220 of the first flow path member 200. Therefore, in a plan view in the up-down direction D3, a short side of the second flow path member 170 extends in the first direction D1, and a long side of the second flow path member 170 extends in the second direction D2.

The second flow path member 170 is preferably formed of, for example, a transparent resin material. Specifically, a material of the second flow path member 170 preferably has a high transmittance for a wavelength of laser light used in a laser processing machine. In this respect, the transmittance of the second flow path member 170 for light having the above-described wavelength is higher than the transmittance of the first flow path member 200 for light having the above-described wavelength. In addition, the absorptivity of the second flow path member 170 for light having the above-described wavelength is lower than the absorptivity of the first flow path member 200 for the light having the above-described wavelength.

Engaging Relationship of Components of Valve Device 100

As shown in FIGS. 4 and 5, the plurality of first valves 130 are disposed on the substrate 120 such that the axial direction of the coil 134 is the first direction D1. Specifically, two first valves 130 are aligned in the first direction D1 and two first valves 130 are aligned in the second direction D2 on the substrate 120. The two first valves 130 aligned in the first direction D1 face in opposite directions to each other. In this respect, the connection portions 133 of the two first valves 130 aligned in the first direction D1 face each other in the first direction D1. Two terminals 139 of the plurality of first valves 130 are connected to the substrate 120. Further, the connection wall 135*c* of the yoke 135 of the first valve 130 is located above the coil 134. At this time, the plate thickness direction of the connection wall 135*c* of the yoke 135 is the up-down direction D3.

Hereinafter, the plurality of first valves 130 located near a first end of the substrate 120 in the first direction D1 are also referred to as "first valves 130A". The plurality of first valves 130 located near a second end of the substrate 120 in the first direction D1 are also referred to as "first valves 130B".

Similarly, the plurality of second valves 140 are disposed on the substrate 120 such that the axial direction of the coil 134 is the first direction D1. Specifically, two second valves 140 are aligned in the first direction D1, and five second valves 140 are aligned in the second direction D2 on the substrate 120. The five second valves 140 are aligned with the two first valves 130 in the second direction D2. The two second valves 140 aligned in the first direction D1 face in opposite directions to each other. In this respect, the connection portions 133 of the two second valves 140 aligned in the first direction D1 face each other in the first direction D1. Two terminals 139 of the plurality of second valves 140 are connected to the substrate 120. The connection wall 135*c* of the yoke 135 of the second valve 140 is located above the coil 134. At this time, the plate thickness direction of the connection wall 135*c* of the yoke 135 is the up-down direction D3.

Hereinafter, the plurality of second valves 140 located near the first end of the substrate 120 in the first direction D1 are also referred to as "second valves 140A". The plurality of second valves 140 located near the second end of the substrate 120 in the first direction D1 are also referred to as "second valves 140B". That is, the five second valves 140A are aligned with the two first valves 130A, and the five second valves 140B are aligned with the two first valves 130B in the second direction D2.

As described above, the substrate 120 supports the plurality of first valves 130 and the plurality of second valves 140 from below. In this respect, the substrate 120 corresponds to a "support member".

As shown in FIGS. 4 and 5, the intermediate member 160 is stacked from above with respect to the connection portions 133 of the plurality of first valves 130 and the connection portions 133 of the plurality of second valves 140 which are densely arranged in the first direction D1 and the second direction D2. At this time, each of the plurality of communication holes 161 of the intermediate member 160 is connected to a respective one of the first connection flow paths 131*b* and the second connection flow paths 131*c* of the plurality of first valves 130 and the first connection flow paths 131*b* and the second connection flow paths 131*c* of the plurality of second valves 140. In this respect, it can be said that the intermediate member 160 makes the first connection flow paths 131*b* and the second connection flow paths 131*c* of the plurality of first valves 130 and the first connection flow paths 131*b* and the second connection flow paths 131*c* of the plurality of second valves 140 extend upward.

Figure 10:
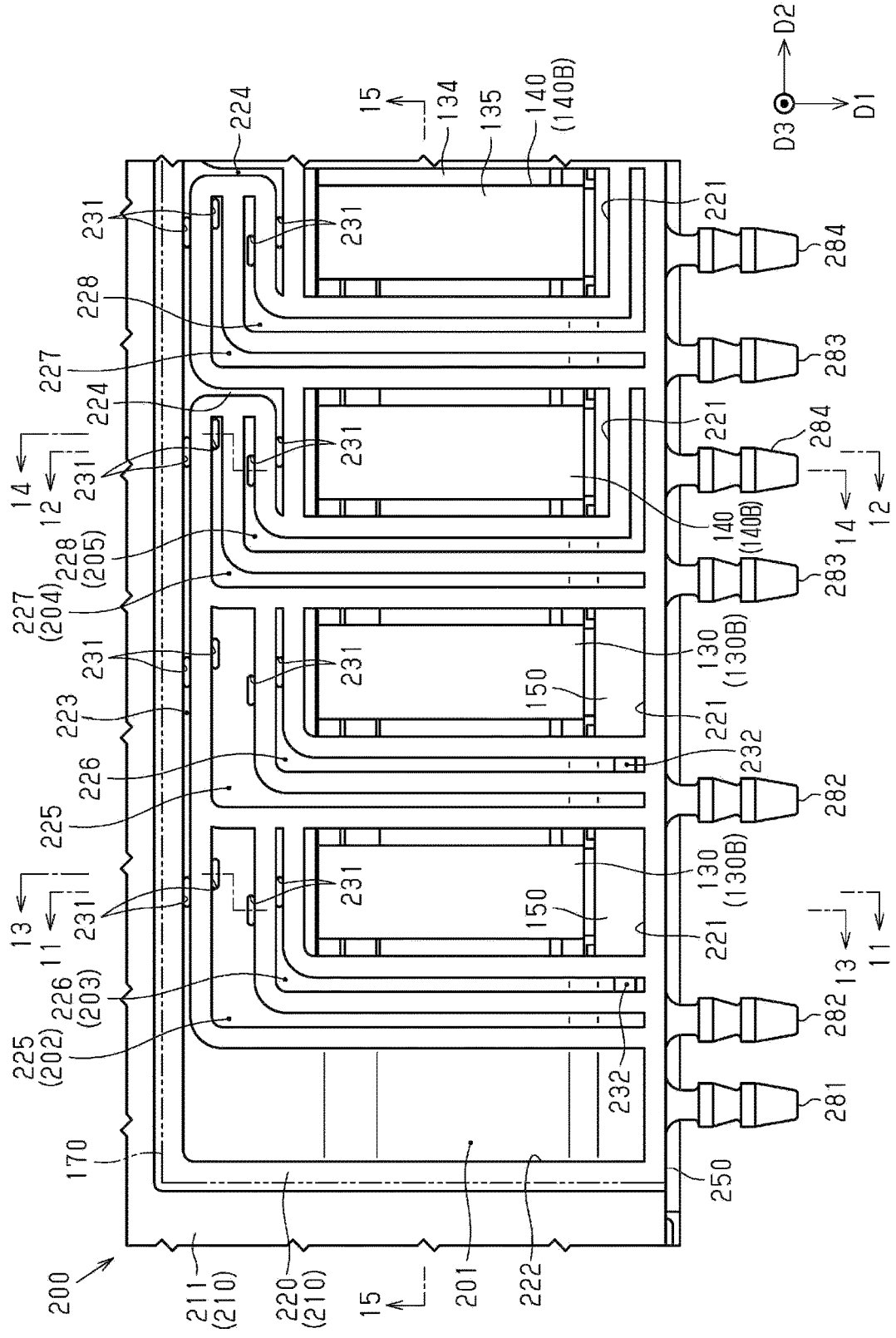
FIG. 10 is a partial plan view of the valve device.

As shown in FIGS. 4, 9, and 10, the first flow path member 200 is stacked on the substrate 120 from above. The first flow path member 200 covers the substrate 120, the plurality of first valves 130, the plurality of second valves 140, and the intermediate member 160 from above. The substrate 120 is fixed to the first flow path member 200 via fastening members such as screws and bolts. In this way, the plurality of first valves 130 and the plurality of second valves 140 and the intermediate member 160 are positioned with respect to the first flow path member 200.

Figure 11:
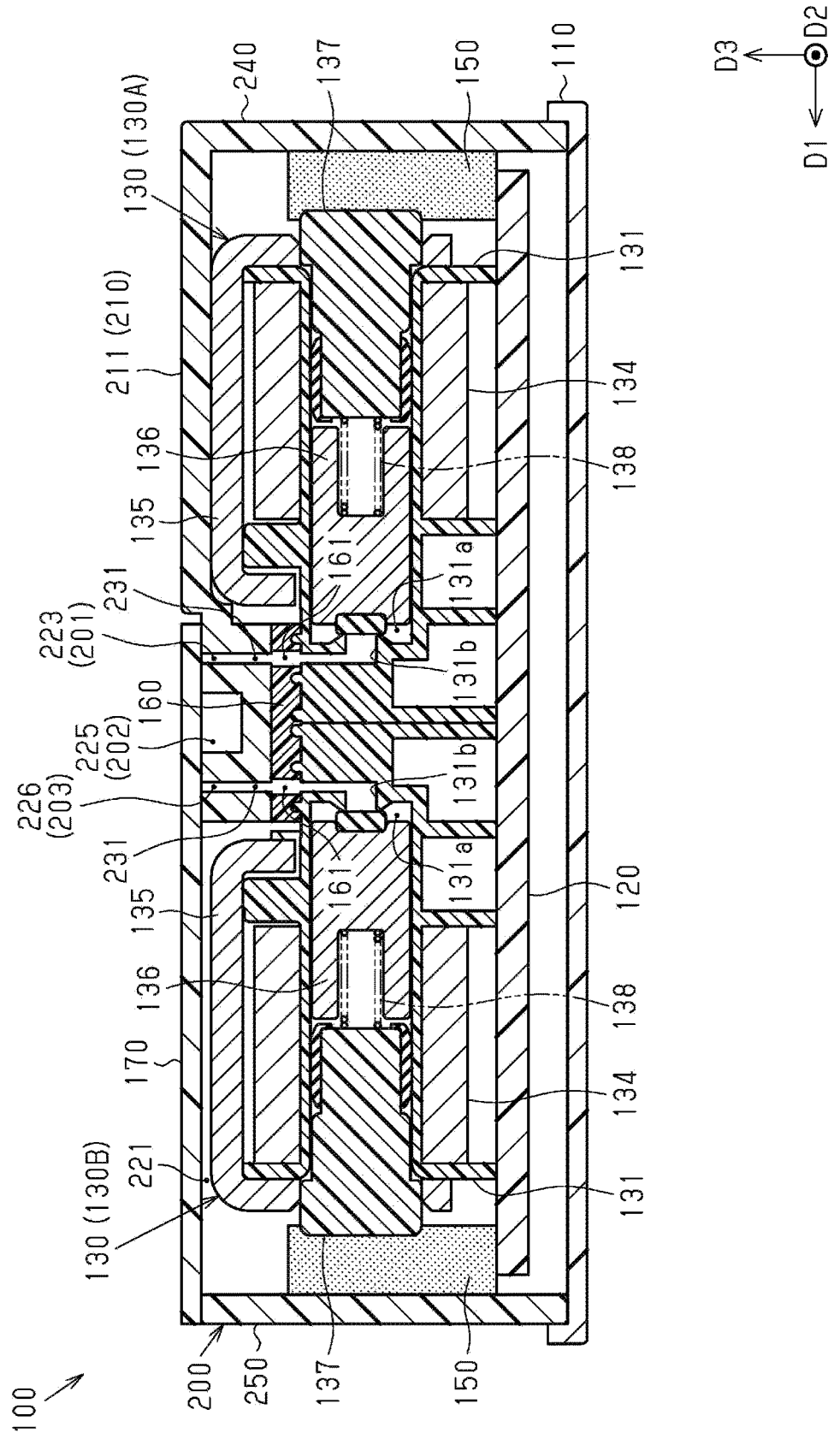
FIG. 11 is a cross-sectional view of the valve device taken along a line 11-11 indicated by arrows in FIG. 10.
Figure 12:
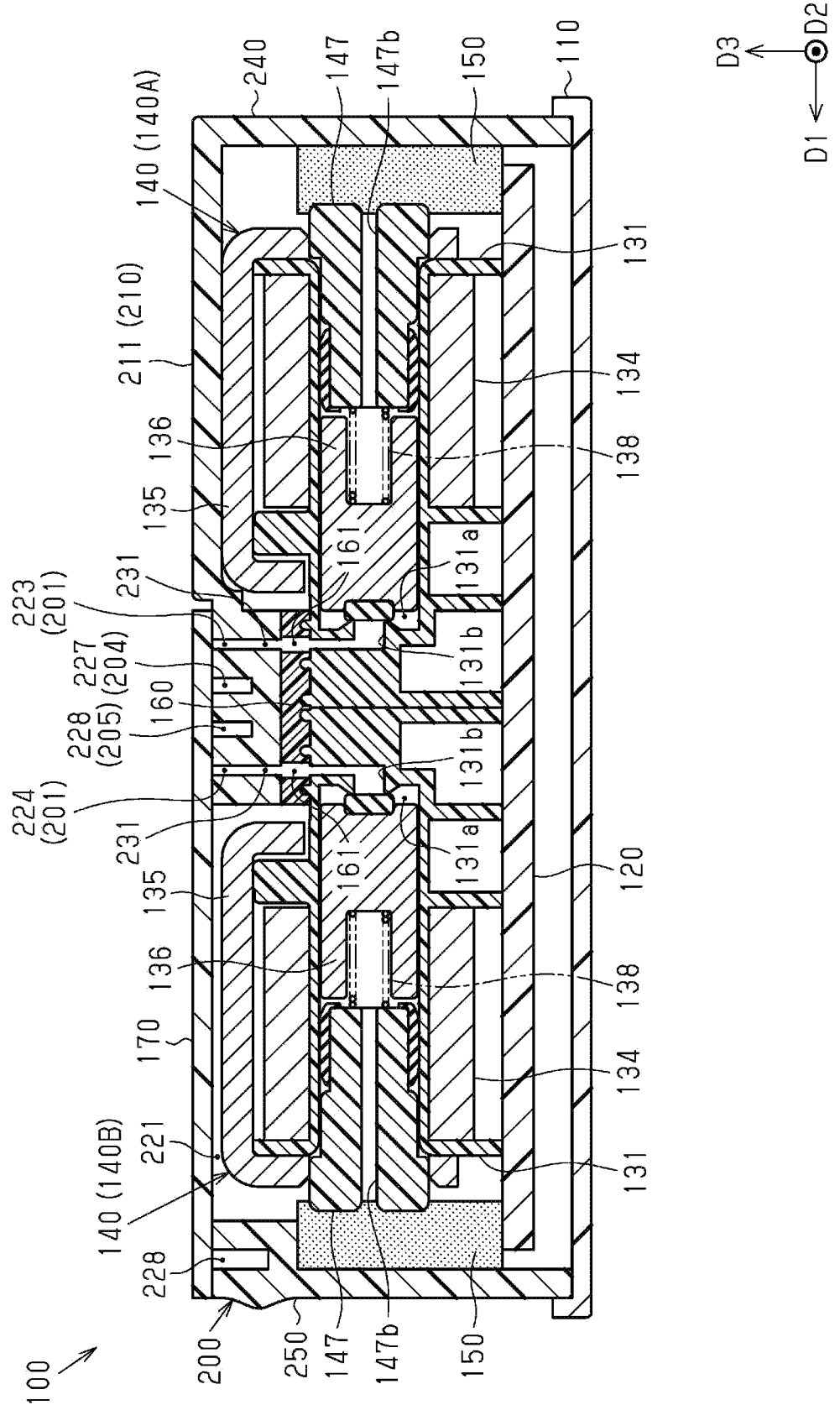
FIG. 12 is a cross-sectional view of the valve device taken along a line 12-12 indicated by arrows in FIG. 10.

As shown in FIGS. 4, 5, and 10, each of the plurality of communication holes 231 of the main groove 223 of the first flow path member 200 is connected to a respective one of the plurality of first valves 130A and the plurality of second valves 140A located on a first side wall 240 side via the intermediate member 160. Specifically, as shown in FIGS. 10 and 11, the communication hole 231 of the main groove 223 of the first flow path member 200 is connected to the first connection flow path 131*b* of the first valve 130A located on the first side wall 240 side via the communication hole 161 of the intermediate member 160. As shown in FIGS. 10 and 12, the communication hole 231 of the main groove 223 of the first flow path member 200 is connected to the first connection flow path 131*b* of the second valve 140A located on the first side wall 240 side via the communication hole 161 of the intermediate member 160.

As shown in FIG. 10, each of the communication holes 231 of the plurality of sub grooves 224 of the first flow path member 200 is connected to a respective one of the plurality of second valves 140B located on a first side wall 250 side via the intermediate member 160. Specifically, as shown in FIGS. 10 and 12, the communication hole 231 of the sub groove 224 of the first flow path member 200 is connected to the first connection flow path 131*b* of the second valve 140B located on the first side wall 250 side via the communication hole 161 of the intermediate member 160.

Figure 13:
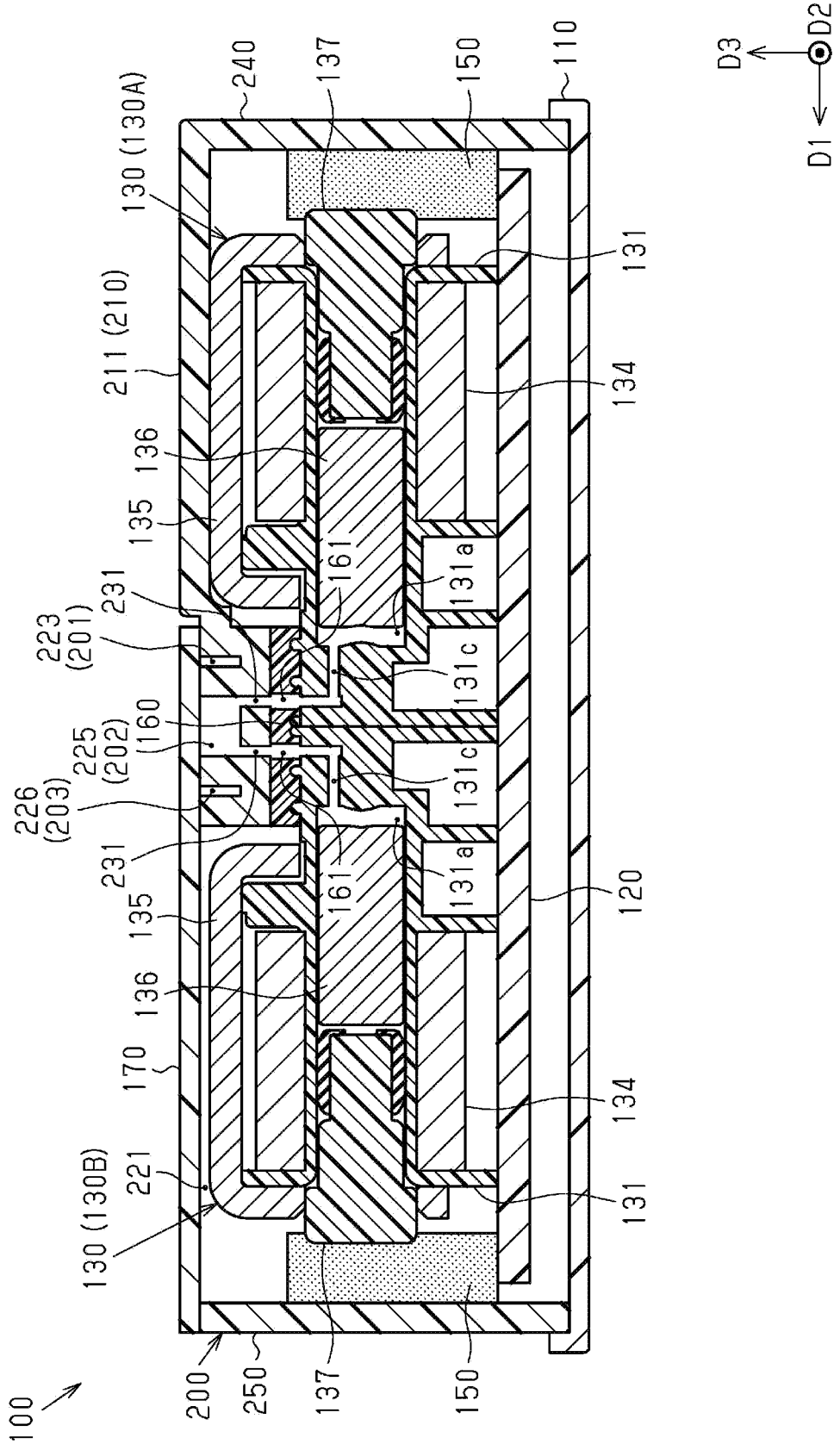
FIG. 13 is a cross-sectional view of the valve device taken along a line 13-13 indicated by arrows in FIG. 10.

As shown in FIG. 10, each of two communication holes 231 of the plurality of first air supply grooves 225 of the first flow path member 200 is connected to a respective one of the plurality of first valves 130 via the intermediate member 160. Specifically, as shown in FIGS. 10 and 13, one communication hole 231 of the first air supply groove 225 of the first flow path member 200 is connected to the second connection flow path 131*c* of the first valve 130A positioned on the first side wall 240 side via the communication hole 161 of the intermediate member 160. The other communication hole 231 of the first air supply groove 225 of the first flow path member 200 is connected to the second connection flow path 131*c* of the first valve 130B located on the first side wall 250 side via the communication hole 161 of the intermediate member 160.

As shown in FIG. 10, each of the communication holes 231 of the plurality of first exhaust grooves 226 of the first flow path member 200 is connected to a respective one of the plurality of first valves 130B via the intermediate member 160. Specifically, as shown in FIGS. 10 and 11, the communication hole 231 of the first exhaust groove 226 of the first flow path member 200 is connected to the first connection flow path 131*b* of the first valve 130B located on the first side wall 250 side via the communication hole 161 of the intermediate member 160.

Figure 14:
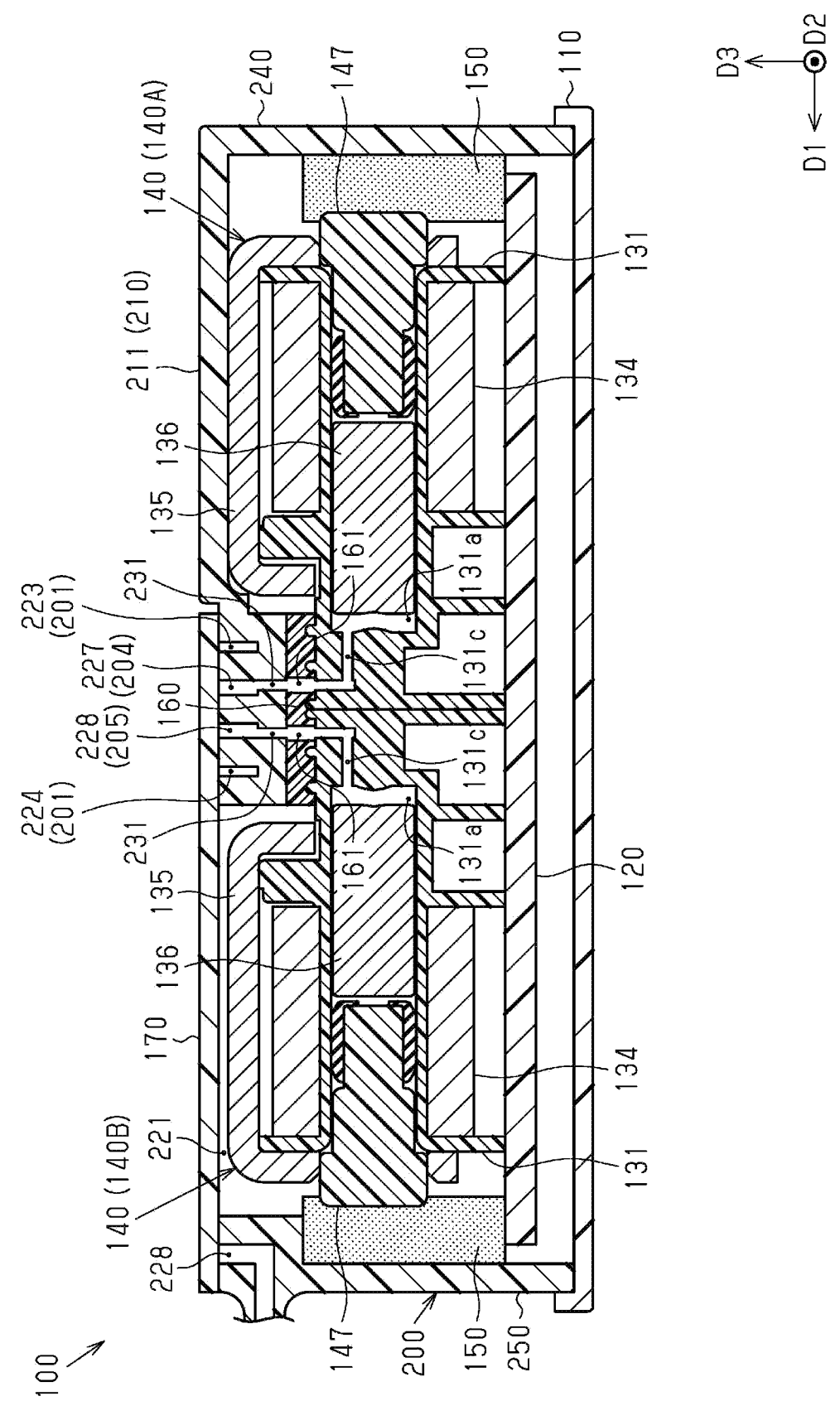
FIG. 14 is a cross-sectional view of the valve device taken along a line 14-14 indicated by arrows in FIG. 10.

As shown in FIG. 10, each of the communication holes 231 of the plurality of second air supply grooves 227 of the first flow path member 200 is connected to a respective one of the plurality of second valves 140A via the intermediate member 160. Specifically, as shown in FIGS. 10 and 14, the communication hole 231 of the second air supply groove 227 of the first flow path member 200 is connected to the second connection flow path 131*c* of the second valve 140A located on the first side wall 240 side via the communication hole 161 of the intermediate member 160. Each of the communication holes 231 of the plurality of second air supply grooves 228 of the first flow path member 200 is connected to a respective one of the plurality of second valves 140B located on the first side wall 250 side via the intermediate member 160. Specifically, as shown in FIGS. 10 and 14, the communication hole 231 of the second air supply groove 228 of the first flow path member 200 is connected to the second connection flow path 131c of the second valve 140B located on the first side wall 250 side via the communication hole 161 of the intermediate member 160.

As shown in FIGS. 4 and 9, two sound absorbing members 150 are disposed between the substrate 120 and the plurality of support ribs 291 and 292 of the first flow path member 200 in the up-down direction D3. As shown in FIGS. 11 and 12, one sound absorbing member 150 is disposed between the plurality of first valves 130A and the plurality of second valves 140A and the first side wall 240 of the first flow path member 200 in the first direction D1. Similarly, the other sound absorbing member 150 is disposed between the plurality of first valves 130B and the plurality of second valves 140B and the first side wall 250 of the first flow path member 200 in the first direction D1. As shown in FIG. 9, one sound absorbing member 150 is disposed between the plurality of support ribs 291 of the first flow path member 200 and the first side wall 240. Similarly, the other sound absorbing member 150 is disposed between the plurality of support ribs 292 of the first flow path member 200 and the first side wall 250.

As shown in FIG. 12, in the plurality of second valves 140, an opening on an atmosphere side of the atmosphere communication path 147b in the cap 147 is closed by the sound absorbing member 150. As shown in FIG. 10, the sound absorbing member 150 is located immediately below the exhaust hole 232 opened in the first exhaust groove 226 of the first flow path member 200, and therefore, the opening on the lower side of the exhaust hole 232 of the first flow path member 200 is closed by the sound absorbing member 150.

As shown in FIGS. 3 and 4, the bottom cover 110 is attached to the first flow path member 200 from below. Specifically, the plurality of erected walls 112 of the bottom cover 110 sandwich the second side walls 260 and 270 of the first flow path member 200 in the second direction D2. On one side in the second direction D2, each of the locking portions 261 of the second side wall 260 is locked to a respective one of the locking holes 113 of the two erected walls 112. On the other side in the second direction D2, each of the locking portions 271 of the second side wall 270 is locked to a respective one of the locking holes 113 of the two erected walls 112. In this way, the bottom cover 110 and the first flow path member 200 are integrated.

As shown in FIGS. 3 and 10, the second flow path member 170 is stacked on the second upper wall 220 of the first flow path member 200 from above. The second flow path member 170 is located above the first flow path member 200. The second flow path member 170 is joined to the second upper wall 220 of the first flow path member 200. In the embodiment, the second flow path member 170 is welded to the first flow path member 200 by laser.

As shown in FIGS. 10 to 15, the second flow path member 170 closes the recessed portion 222, the main groove 223, the plurality of sub grooves 224, the plurality of first air supply grooves 225, the plurality of first exhaust grooves 226, the plurality of second air supply grooves 227, and the plurality of second air supply grooves 228 of the first flow path member 200. As a result, the recessed portion 222, the main groove 223, and the sub grooves 224 of the first flow path member 200 and the second flow path member 170 form a main flow path 201. The first air supply grooves 225 of the first flow path member 200 and the second flow path member 170 form a first air supply flow path 202, and the first exhaust grooves 226 of the first flow path member 200 and the second flow path member 170 form a first exhaust flow path 203. Further, the second air supply grooves 227 of the first flow path member 200 and the second flow path member 170 form a second air supply flow path 204, and the second air supply grooves 228 of the first flow path member 200 and the second flow path member 170 form a second air supply flow path 205. As shown in FIG. 2, the first air supply flow path 202, the first exhaust flow path 203, and the second air supply flow paths 204 and 205 are connected to the main flow path 201. In this respect, the first air supply flow path 202, the first exhaust flow path 203, and the second air supply flow paths 204 and 205 correspond to "sub flow paths".

Figure 15:
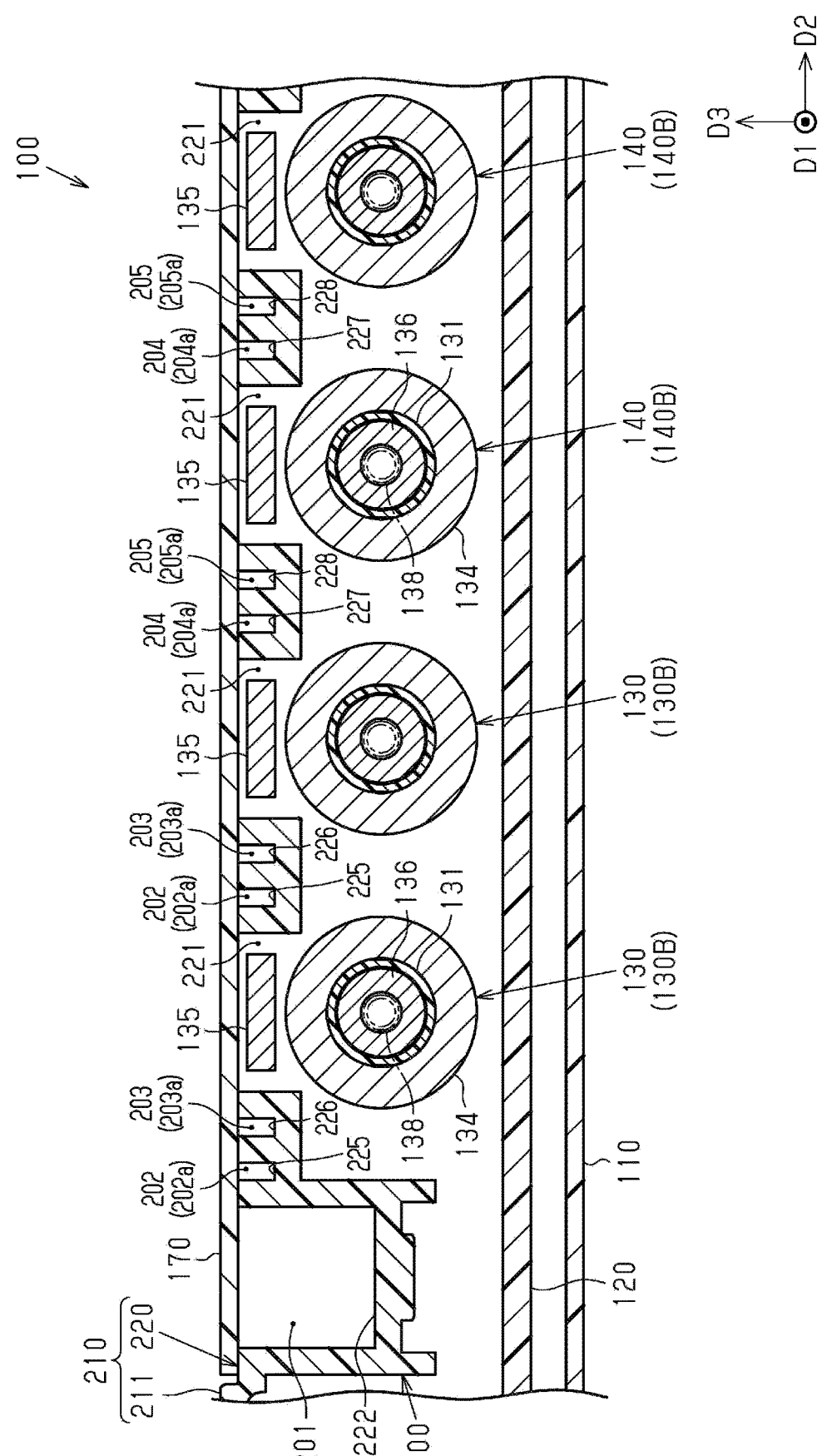
FIG. 15 is a cross-sectional view of the valve device taken along a line 15-15 indicated by arrows in FIG. 10.

As described above, regarding the main groove 223 of the first flow path member 200, the plurality of sub grooves 224, the first parts 225a of the plurality of first air supply grooves 225, the plurality of first exhaust grooves 226, and the plurality of second air supply grooves 227 and 228, the groove width is smaller than the groove depth. Further, in the embodiment, the flow paths 201 to 205 are formed when the second flow path member 170 having a flat plate shape covers the above-described grooves. Accordingly, as shown in FIG. 15, in the flow paths 201 to 205, the width of the flow path is smaller than the depth of the flow path except for a part corresponding to the recessed portion 222 in the main flow path 201 and the second part 225b in the first air supply flow path 202. The main groove 223, the plurality of sub grooves 224, the plurality of first air supply grooves 225, the plurality of first exhaust grooves 226, and the plurality of second air supply grooves 227 and 228 of the first flow path member 200 extend in the first direction D1 or the second direction D2. Accordingly, the main flow path 201, the first air supply flow path 202, the first exhaust flow path 203, and the second air supply flow paths 204 and 205 extend in the first direction D1 and the second direction D2 intersecting the up-down direction D3.

As shown in FIG. 11, the first connection flow path 131b of the first valve 130A is connected to the main flow path 201, and as shown in FIG. 13, the second connection flow path 131c of the first valve 130A is connected to the first air supply flow path 202. In this respect, it can be said that the first valve 130A is a valve that opens and closes the main flow path 201 and the first air supply flow path 202. As shown in FIG. 11, the first connection flow path 131b of the first valve 130B is connected to the first exhaust flow path 203, and as shown in FIG. 13, the second connection flow path 131c of the first valve 130B is connected to the first air supply flow path 202. In this respect, it can be said that the first valve 130B is a valve that opens and closes the first air supply flow path 202 and the first exhaust flow path 203.

As shown in FIG. 12, the first connection flow path 131b of the second valve 140A is connected to the main flow path 201, and as shown in FIG. 14, the second connection flow path 131c of the second valve 140A is connected to the second air supply flow path 204. In this respect, it can be said that the second valve 140A is a valve that opens and closes the main flow path 201 and the second air supply flow path 204. As shown in FIG. 12, the first connection flow path 131b of the second valve 140B is connected to the main flow path 201, and as shown in FIG. 14, the second connection flow path 131c of the second valve 140B is connected to the second air supply flow path 205. In this respect, it can be said that the second valve 140B is a valve that opens and closes the main flow path 201 and the second air supply flow path 205.

As shown in FIG. 2, the air supply tube 51 is connected to the air supply nozzle 281. Therefore, the main flow path 201 is connected to the pump 30 via the air supply tube 51. In this respect, the air supply nozzle 281 is a nozzle that causes air as a fluid to flow into the main flow path 201. Each of the plurality of first connection tubes 52 is connected to a respective one of the plurality of first connection nozzles 282. Therefore, each of the plurality of first air supply flow paths 202 is connected to a respective one of the plurality of first air bags 41 via a respective one of the plurality of first connection tubes 52. Each of the plurality of second connection tubes 53 is connected to a respective one of the plurality of second connection nozzles 283 and 284. Therefore, each of the plurality of second air supply flow paths 204 and 205 is connected to a respective one of the plurality of second air bags 42 via a respective one of the plurality of second connection tubes 53. In this respect, the first connection nozzle 282 and the second connection nozzles 283 and 284 are nozzles that cause air as a fluid to flow out from the plurality of "sub flow paths".

As shown in FIGS. 10 and 15, the second flow path member 170 closes the plurality of exposure holes 221 of the first flow path member 200. At this time, as shown in FIGS. 11 to 15, a gap is present between the plurality of first valves 130B and the plurality of second valves 140B and the second flow path member 170 in the up-down direction D3. Meanwhile, as shown in FIGS. 11 to 14, no gap is present between the plurality of first valves 130A and the plurality of second valves 140A and the upper wall 210 of the first flow path member 200 in the up-down direction D3.

As shown in FIGS. 11 to 15, in the plurality of first valves 130B, the uppermost part of the first valve 130B is the yoke 135. Similarly, in the plurality of second valves 140B, the uppermost part of the second valve 140B is the yoke 135. In the cross-sectional view shown in FIG. 15, a first part 202a of the first air supply flow path 202 extending in the first direction D1 and a first part 203a of the first exhaust flow path 203 extending in the first direction D1 are located on the left of the yoke 135 of the first valve 130B. Similarly, a first part 204a of the second air supply flow path 204 extending in the first direction D1 and a first part 205a of the second air supply flow path 205 extending in the first direction D1 are located on the left of the yoke 135 of the second valve 140B.

In this respect, the first part 202a of the first air supply flow path 202 and the first part 203a of the first exhaust flow path 203 are located to be shifted in the second direction D2 from the uppermost portion of the first valve 130B. Similarly, the first part 204a of the second air supply flow path 204 and the first part 205a of the second air supply flow path 205 are located to be shifted in the second direction D2 from the uppermost portion of the first valve 130B.

In the second direction D2, the first parts 202a of the plurality of first air supply flow paths 202 are alternately aligned with the plurality of first valves 130B, and the first parts 203a of a plurality of first exhaust flow paths 203 are alternately aligned with the plurality of first valves 130B. Similarly, in the second direction D2, the first parts 204a of the plurality of second air supply flow paths 204 are alternately aligned with the plurality of second valves 140B, and the first parts 205a of the five second air supply flow paths 205 are alternately aligned with the plurality of second valves 140B.

Regarding the main flow path 201, a height of a bottom surface of a part excluding a part connected to the air supply nozzle 281 is set as a reference height. Regarding the first air supply flow path 202, a height of a bottom surface of a part excluding a part connected to the first connection nozzle 282 is equal to the reference height. Regarding the first exhaust flow path 203, a height of a bottom surface of a part excluding a part connected to the exhaust hole 232 is equal to the reference height. Further, regarding the second air supply flow paths 204 and 205, a height of a bottom surface of a part excluding a part connected to the second connection nozzles 283 and 284 is equal to the reference height. Accordingly, in the cross sections shown in FIGS. 11 to 15, the bottom surface of the main flow path 201, the bottom surface of the first air supply flow path 202, the bottom surface of the first exhaust flow path 203, and the bottom surfaces of the second air supply flow paths 204 and 205 have the same height.

Relationship Between Corresponding Valve and Air Bag

A relationship between one first air bag 41 and two first valves 130A and 130B corresponding to the one first air bag 41 will be described.

As shown in FIG. 2, when the first valve 130A is in a cutoff state, the main flow path 201 and the first air supply flow path 202 are cut off, and therefore, the pump 30 is not connected to the first air bag 41. On the other hand, when the first valve 130A is in a connection state, the main flow path 201 is connected to the first air supply flow path 202, and therefore, the pump 30 is connected to the first air bag 41. When the first valve 130B is in the cutoff state, the first exhaust flow path 203 and the first air supply flow path 202 are cut off, and therefore, the first air bag 41 is not connected to the atmosphere. On the other hand, when the first valve 130B is in the connection state, the first air bag 41 is connected to the atmosphere.

As described above, when the first valve 130A is in the connection state and the first valve 130B is in the cutoff state, the first air bag 41 is in a state in which the first air bag 41 can be expanded by the air supply. On the other hand, when the first valve 130A is in the cutoff state and the first valve 130B is in the connection state, the first air bag 41 is in a state in which the first air bag 41 can be contracted by air exhaustion. When the first valve 130A is in the cutoff state and the first valve 130B is in the cutoff state, air cannot be supplied to or exhausted from the first air bag 41. That is, the first air bag 41 cannot be expanded or contracted. In this way, the air supply and exhaustion of the first air bag 41 are adjusted by the corresponding first valve 130A and first valve 130B. In this respect, the first valve 130A is a valve for supplying air, and the first valve 130B is a valve for exhausting air.

A relationship between one second air bag 42 and one second valve 140 corresponding to the one second air bag 42 will be described.

As shown in FIG. 2, when the second valve 140A is in an exhaustion state, the main flow path 201 and the second air supply flow path 204 are cut off, and the second air supply flow path 204 is connected to the atmosphere. That is, when the second valve 140A is in the exhaustion state, the second air bag 42 is connected to the atmosphere, and the second air bag 42 is not connected to the pump 30. On the other hand, when the second valve 140A is in an air supply state, the main flow path 201 is connected to the second air supply flow path 204, and the second air supply flow path 204 is cut off from the atmosphere. That is, when the second valve 140A is in the air supply state, the second air bag 42 is connected to the pump 30, and the second air bag 42 is not connected to the atmosphere.

As described above, when the second valve 140A is in the air supply state, the corresponding second air bag 42 is in a state in which the second air bag 42 can be expanded by the air supply. On the other hand, when the second valve 140A is in the exhaustion state, the corresponding second air bag 42 is in a state in which the second air bag 42 can be contracted by the air exhaustion. Although the second valve 140A has been described, the same applies to the second valve 140B. In this way, the air supply and exhaustion of the second air bag 42 are adjusted by one corresponding second valve 140. In this respect, the second valve 140 is a valve for air supply and exhaustion.

Operation Unit 60

The operation unit 60 is operated by the user to drive the pneumatic system 20. The operation unit 60 may be a remote controller or may be provided on an instrument panel. The operation unit 60 includes an expansion button for expanding the first air bag 41, a reduction button for contracting the first air bag 41, and a start/end button for starting and ending massage using the second air bag 42. The operation unit 60 outputs a control signal corresponding to the operated button to the control device 70.

Control Device 70

The control device 70 is implemented by a processing circuit including a computer and a memory. The control device 70 controls the pump 30 and the valve device 100 based on a program stored in the memory and an operation content of the operation unit 60. Specifically, the control device 70 performs a support operation of adjusting sizes of the plurality of first air bags 41 and a massage operation of expanding and contracting the plurality of second air bags 42 at predetermined intervals. In another embodiment, the processing circuit forming the control device 70 may be mounted on the substrate 120 of the valve device 100. That is, the control device 70 may be incorporated into the valve device 100.

Support Operation of Control Device 70

The control device 70 starts the support operation when the user operates the expansion button or the reduction button provided on the operation unit 60.

When the expansion button is operated, the control device 70 starts to drive the pump 30. Subsequently, the control device 70 brings the first valve 130A corresponding to the first air bag 41 into the connection state, and brings the first valve 130B corresponding to the first air bag 41 into the cutoff state. In other words, the control device 70 starts to supply power to the first valve 130A corresponding to the first air bag 41. In this way, the control device 70 causes the first air bag 41 to expand by supplying air to the first air bag 41. When the user stops operating the expansion button, the control device 70 stops driving the pump 30. In addition, the control device 70 brings the first valves 130A and 130B corresponding to the first air bag 41 into the cutoff state. In other words, the control device 70 stops supplying power to the first valve 130A corresponding to the first air bag 41. In this way, the control device 70 maintains the size of the first air bag 41.

In contrast, when the reduction button is operated, the control device 70 does not start to drive the pump 30. Subsequently, the control device 70 brings the first valve 130A corresponding to the first air bag 41 into the cutoff state, and brings the first valve 130B corresponding to the first air bag 41 into the connection state. In other words, the control device 70 starts to supply power to the first valve

130B corresponding to the first air bag 41. In this way, the control device 70 causes the first air bag 41 to contract by exhausting air from the first air bag 41. When the user stops the operation on the reduction button, the control device 70 brings the first valves 130A and 130B corresponding to the first air bag 41 into the cutoff state. In other words, the control device 70 stops supplying power to the first valve 130B corresponding to the first air bag 41. In this way, the control device 70 maintains the size of the first air bag 41.

Massage Operation of Control Device 70

When the user operates the start/end button provided on the operation unit 60, the control device 70 starts the massage operation.

When the start/end button is operated, the control device 70 starts to drive the pump 30. Subsequently, the control device 70 switches a state of the second valve 140 between the air supply state and the exhaustion state at predetermined intervals. In other words, the control device 70 alternately switches between a state in which power is supplied to the second valve 140 corresponding to the second air bag 42 and a state in which power is not supplied to the second valve 140. In this way, the control device 70 causes the second air bag 42 to expand and contract at predetermined intervals. When the start/end button is operated during the massage operation, the control device 70 stops driving the pump 30. Subsequently, the control device 70 brings the second valve 140 into the exhaustion state. In other words, the control device 70 stops supplying power to the second valve 140 corresponding to the second air bag 42. In this way, when the second air bag 42 is expanded, the control device 70 causes the second air bag 42 to contract.

As described above, the control device 70 causes one second air bag 42 to expand and contract by controlling one second valve 140. Actually, the control device 70 causes the plurality of second air bags 42 to expand and contract by simultaneously controlling the plurality of second valves 140. When the user wants to receive a massage on the lower half of the body, the control device 70 may control the plurality of second valves 140 respectively corresponding to the plurality of second air bags 42 provided in the seat cushion 11. Similarly, when the user wants to receive a massage on the upper half of the body, the control device 70 may control the plurality of second valves 140 respectively corresponding to the plurality of second air bags 42 provided in the seat back 12.

Function of Embodiment

A function of the seat 10 during the support operation will be described.

When the user wants to stabilize a sitting posture with respect to the seat 10, the user operates the expansion button or the reduction button of the operation unit 60.

When the user operates the expansion button, the first air bag 41 expands for a period during which the expansion button is operated. That is, a force with which the first air bag 41 pushes the back of the user is increased. Thereafter, when the pressing force of the first air bag 41 reaches an appropriate pressing force, the user stops the operation on the expansion button. Accordingly, the first air bag 41 is no longer expanded, and a volume of the first air bag 41 is no longer changed. As a result, the first air bag 41 supports the waist of the user in a manner desired by the user.

In contrast, when the user operates the reduction button, the first air bag 41 contracts for a period during which the reduction button is operated. That is, the force with which the first air bag 41 pushes the back of the user is decreased.

Thereafter, when the pressing force of the first air bag 41 reaches an appropriate pressing force, the user stops the operation on the reduction button. Accordingly, the first air bag 41 does not contract, and the volume of the first air bag 41 does not change. As a result, the first air bag 41 supports the waist of the user in a manner desired by the user.

A function of the seat 10 during the massage operation will be described.

When the user wants to start the massage operation, the user operates the start/end button. Then, the plurality of second air bags 42 repeatedly expand and contract at predetermined intervals. As a result, the second air bag 42 massages a portion of the body of the user in contact with the second air bag 42.

Effects of Embodiment (1) The plurality of flow paths 202 to 205 of the valve device 100 are located to be shifted from the uppermost portions of the first valve 130B and the second valve 140B in the direction perpendicular to the up-down direction D3. In other words, the plurality of flow paths 202 to 205 of the valve device 100 are not located directly above or directly below the uppermost portions of the first valve 130B and the second valve 140B. Therefore, in the valve device 100, an increase in the thickness of the device in the up-down direction D3 can be prevented by aligning the plurality of flow paths 202 to 205, the first valve 130B, and the second valve 140B in the up-down direction D3. That is, the valve device 100 can be easily disposed in a flat space inside the seat 10.

(2) In most of the plurality of flow paths 202 to 205 provided around the first valve 130B and the second valve 140B, the width of the flow path is smaller than the depth of the flow path. Therefore, in the valve device 100, cross-sectional areas of the plurality of flow paths 202 to 205 can be ensured without increasing the width of the plurality of flow paths 202 to 205 by increasing the depth of the plurality of flow paths 202 to 205. That is, in the valve device 100, it is possible to prevent an increase in the size of the device in the width direction of the plurality of flow paths 202 to 205, that is, the first direction D1 and the second direction D2 perpendicular to the up-down direction D3.

(3) In the second direction D2, the plurality of first valves 130B and the plurality of second valves 140B located on the first side wall 250 side and the first parts 202a to 205a of the plurality of flow paths 202 to 205 are alternately aligned. Accordingly, in the valve device 100, the depths of the first parts 202a to 205a can be increased while avoiding interference between the plurality of first valves 130B and the plurality of second valves 140B and the first parts 202a to 205a of the plurality of flow paths 202 to 205. That is, in the valve device 100, the cross-sectional areas of the flow paths of the first parts 202a to 205a can be ensured by the depths of the first parts 202a to 205a of the plurality of flow paths 202 to 205. Accordingly, in the valve device 100, it is possible to prevent an increase in the size of the device in the width direction of the first parts 202a to 205a of the plurality of flow paths 202 to 205, that is, the second direction D2.

(4) In the case of Comparative Example in which the first flow path member 200 in which the plurality of exposure holes 221 are not included is provided, the plurality of first valves 130B and the plurality of second valves 140B are disposed below the first flow path member 200. In this case, since the second flow path member 170 cannot be disposed close to the plurality of first valves 130B and the plurality of second valves 140B in the up-down direction D3, a thickness of the device in the up-down direction D3 is likely to increase. In contrast, in the valve device 100 according to the embodiment, the first flow path member 200 includes the plurality of exposure holes 221 from which the plurality of first valves 130B and the plurality of second valves 140B are respectively exposed. Therefore, in the valve device 100, the second flow path member 170 can be disposed close to the plurality of first valves 130B and the plurality of second valves 140B in the up-down direction D3. As a result, in the valve device 100, an increase in the thickness of the device in the up-down direction D3 can be further suppressed.

(5) Comparative Example in which the second flow path member 170 comes into contact with the plurality of first valves 130B and the plurality of second valves 140B in the up-down direction D3 is considered. In this case, since the first flow path member 200 does not appropriately come into contact with the second flow path member 170, the flow paths 202 to 205 may not be closed or the shapes of the flow paths 202 to 205 may be deformed. In contrast, in the embodiment, as shown in FIG. 15, the second flow path member 170 does not come into contact with the plurality of first valves 130B and the plurality of second valves 140B in the up-down direction D3. Accordingly, in the valve device 100, it is possible to prevent the occurrence of the problem in the flow paths 202 to 205 due to the contact between the second flow path member 170 and the plurality of first valves 130B and the plurality of second valves 140B.

(6) When the first valve 130B is in the connection state, air exhausted from the first air bag 41 flows into the first exhaust flow path 203. Thereafter, the air is discharged through the exhaust hole 232. Similarly, when the second valve 140 is in the exhaustion state, the air exhausted from the second air bag 42 flows into the internal space 131a of the second valve 140. Thereafter, the air is discharged through the atmosphere communication path 147b. In the valve device 100 according to the embodiment, an opening of the exhaust hole 232 and an opening of the atmosphere communication path 147b are covered with the sound absorbing member 150. Therefore, in the valve device 100, exhaustion noise from the first air bag 41 and the second air bag 42 can be reduced.

Modification

The embodiment can be modified as follows. The embodiment and the following modifications can be combined with each other without technical contradiction.

Figure 16:
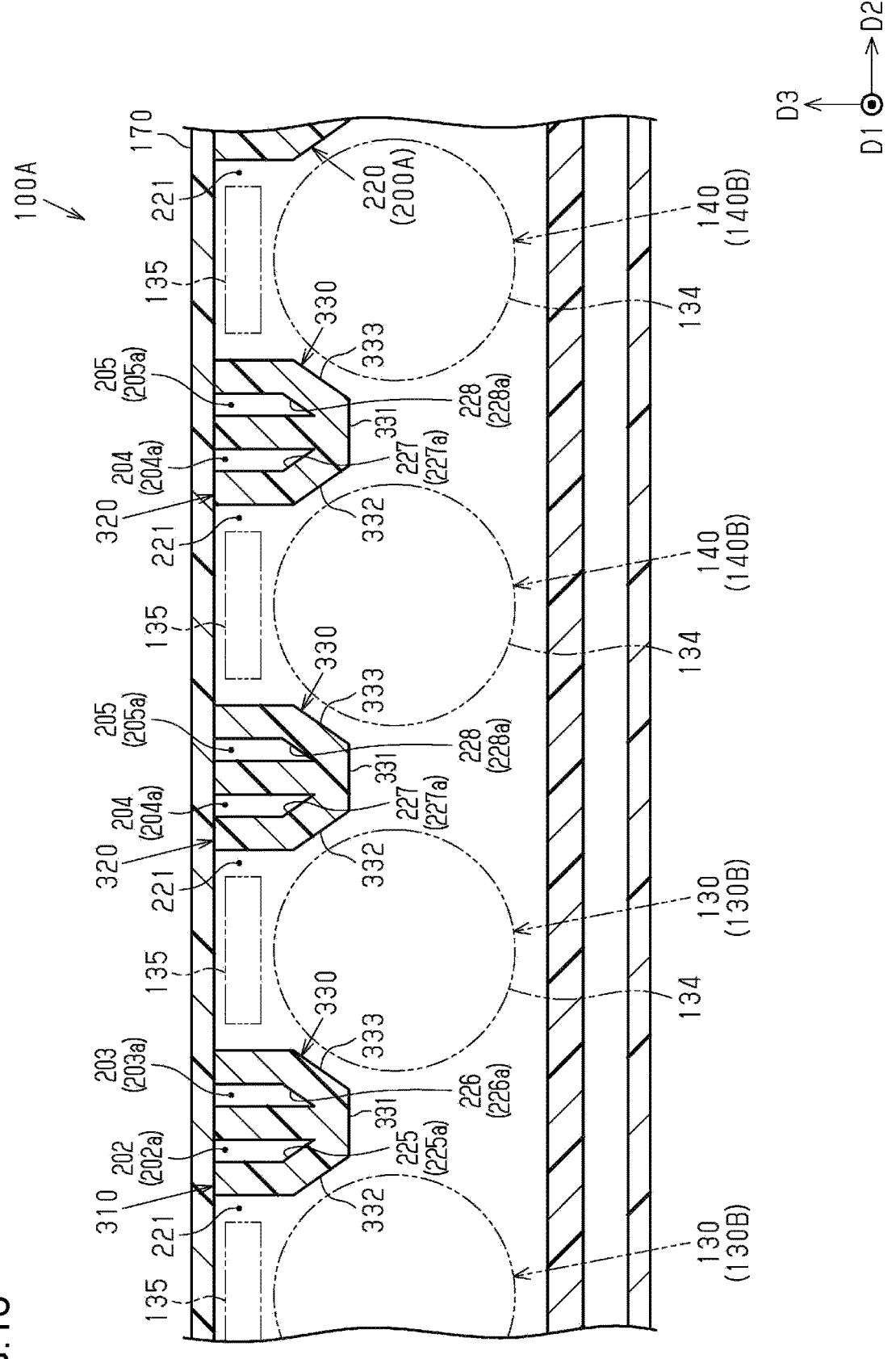
FIG. 16 is a cross-sectional view of a valve device according to a modification.

The valve device 100 can be modified to a valve device 100A shown in FIG. 16. The valve device 100A is different from the above-described embodiment in the configuration of a first flow path member 200A. Therefore, the first flow path member 200A will be described. In the first flow path member 200A according to the modification shown in FIG. 16, a part forming the first part 225a of the first air supply groove 225 and the first part 226a of the first exhaust groove 226 is referred to as a first part forming portion 310. A part forming the first part 227a of the second air supply groove 227 and the first part 228a of the second air supply groove 228 is referred to as a first part forming portion 320. The plurality of first part forming portions 310 and 320 are alternately aligned with the plurality of exposure holes 221 in the second direction D2.

Similarly to the above-described embodiment, in the second direction D2, an interval between two valves adjacent to each other in the second direction D2 among the plurality of first valves 130B and the plurality of second valves 140B decreases as the two valves go downward. In the second direction D2, the widths of the first part forming portions 310 and 320 become smaller as the first part forming portions 310 and 320 approach the bottom cover 110 after maintaining a constant width.

A bottom surface 330 of each of the first part forming portions 310 and 320 has a first lower surface 331 perpendicular to the up-down direction D3 and two second lower surfaces 332 and 333 inclined with respect to the up-down direction D3. The first lower surface 331 faces the substrate 120. Of the two second lower surfaces 332 and 333, one second lower surface 332 is connected to one end of the first lower surface 331 in the second direction D2, and the other second lower surface 333 is connected to the other end of the first lower surface 331 in the second direction D2. The two second lower surfaces 332 and 333 are inclined downward toward a center of each of the first part forming portions 310 and 320 in the second direction D2. As a result, the two second lower surfaces 332 and 333 face the valves located on both sides of each of the first part forming portions 310 and 320 in the second direction D2.

In the first part forming portion 310 located on the left of the first valve 130B, a bottom surface of the first part 225a of the first air supply groove 225 extends along the second lower surface 332. Similarly, a bottom surface of the first part 226a of the first exhaust groove 226 extends along the second lower surface 333. That is, the bottom surface of the first part 225a of the first air supply groove 225 and the bottom surface of the first part 226a of the first exhaust groove 226 are inclined with respect to the up-down direction D3.

Similarly, in the first part forming portion 320 located on the left of the second valve 140B, a bottom surface of the first part 227a of the second air supply groove 227 extends along the second lower surface 332. Similarly, a bottom surface of the first part 228a of the second air supply groove 228 extends along the second lower surface 333. That is, the bottom surfaces of the first part 227a of the second air supply groove 227 and the first part 228a of the second air supply groove 228 are inclined with respect to the up-down direction D3.

In the valve device 100A according to the modification, each of the first part forming portions 310 and 320 can be extended downward between two valves adjacent to each other in the second direction D2. In this respect, in the valve device 100A, the depths of the first air supply flow path 202, the first exhaust flow path 203, and the second air supply flow paths 204 and 205 can be ensured. Bottom surfaces of the first part 202a of the first air supply flow path 202 and the first part 203a of the first exhaust flow path 203 extend along the second lower surface 332 and the second lower surface 333 of the first part forming portion 310, respectively. Bottom surfaces of the first part 204a of the second air supply flow path 204 and the first part 205a of the second air supply flow path 205 extend along the second lower surface 332 and the second lower surface 333 of the first part forming portion 320, respectively. Therefore, in the valve device 100A, the depths of the first air supply flow path 202, the first exhaust flow path 203, and the second air supply flow paths 204 and 205 can be further ensured.

The first air bag 41 may be an air bag for driving a side support of the seat cushion 11 and a side support of the seat back 12. The first air bag 41 may be an air bag for driving another support of the seat 10.

In the first flow path member 200, the shapes of the main groove 223, the plurality of sub grooves 224, the plurality of first air supply grooves 225, the plurality of first exhaust grooves 226, and the plurality of second air supply grooves 227 and 228 may be appropriately changed. For example, the width of each of these grooves may be larger than the depth of each of these grooves. These grooves may be curved in a plan view in the up-down direction D3, or may extend in a direction intersecting both the first direction D1 and the second direction D2.

The first flow path member 200 and the second flow path member 170 may be integrally formed as one flow path member.

In the first flow path member 200, the second upper wall 220 may not include the exposure holes 221. In this case, the plurality of first valves 130B and the plurality of second valves 140B are disposed between the substrate 120 and the second upper wall 220. That is, in a plan view of the valve device 100, the plurality of first valves 130B and the plurality of second valves 140B are not seen through the second flow path member 170.

The transmittance of the second flow path member 170 may be equal to the transmittance of the first flow path member 200. In this case, the second flow path member 170 is preferably bonded or fastened to the first flow path member 200.

The valve device 100 may include a "support member" that supports the plurality of first valves 130 and the plurality of second valves 140 instead of the substrate 120. The support member may have a plate shape similar to the substrate 120, or may have a box shape.

The valve device 100 may include only one or more first valves 130 as solenoid valves. The valve device 100 may include only one or more second valves 140 as solenoid valves.

The shapes of the first valve 130 and the second valve 140 can be appropriately changed. For example, the first valve 130 and the second valve 140 may be formed in a rectangular parallelepiped shape by being covered with a rectangular parallelepiped housing.

In the valve device 100, the plurality of second connection nozzles 283 may be provided in the first side wall 240 of the first flow path member 200.

The shape of the valve device 100 may be appropriately changed as long as the thickness in the up-down direction D3 is smaller than the length in each of the first direction D1 and the second direction D2. For example, the length of the valve device 100 in the first direction D1 may be equal to the length of the valve device 100 in the second direction D2.

When the valve device 100 is mounted on an object such as the seat 10, the up-down direction D3 of the valve device 100 does not necessarily match an up-down direction of the seat 10.

The use of the valve device 100 is not limited to the seat 10 of the vehicle. For example, in the valve device 100, a gas other than air or a liquid may be handled depending on the use.

The aspects for solving the above-described problems and the functions and effects thereof will be described below.

Aspect 1

According to an aspect of this disclosure, a valve device includes: a flow path member having a flow path; a plurality of solenoid valves configured to open and close the flow path; and a support member configured to support the plurality of solenoid valves from below in an up-down direction and be stacked with the flow path member in the up-down direction. When a part located at an uppermost position in the up-down direction of each of the solenoid valves is defined as an uppermost portion, the flow path is located to be shifted from the uppermost portions of the plurality of solenoid valves in a direction perpendicular to the up-down direction.

The flow path of the flow path member is located to be shifted from the uppermost portion of the solenoid valve in a direction perpendicular to the up-down direction. In other words, the flow path of the flow path member is not located directly above or directly below the uppermost portion of the solenoid valve. Therefore, in the valve device, the flow path and the solenoid valve can be prevented from being aligned in the up-down direction. Accordingly, an increase in a thickness of the valve device in the up-down direction can be prevented.

Aspect 2

In the valve device according to aspect 1, the flow path extends in a direction intersecting the up-down direction, and a width of the flow path is smaller than a depth of the flow path.

In the valve device, a cross-sectional area of a flow path can be ensured without increasing the width of the flow path by increasing the depth of the flow path. In this respect, in the valve device, it is possible to prevent an increase in the size of the device in a width direction of the flow path, that is, the direction perpendicular to the up-down direction.

Aspect 3

In the valve device according to aspect 1 or 2, the flow path includes a main flow path and a plurality of sub flow paths that are connected to the main flow path and separately opened and closed by the plurality of solenoid valves, when the direction perpendicular to the up-down direction is defined as a first direction, and a direction perpendicular to both the up-down direction and the first direction is defined as a second direction, the plurality of sub flow paths each include a first part extending in the first direction, and the first parts of the plurality of sub flow paths are alternately aligned with the plurality of solenoid valves in the second direction.

In the valve device, it is possible to prevent an increase in the thickness in the up-down direction of the device due to the solenoid valve and the first part of the sub flow path overlapping each other in the up-down direction. Further, in the valve device, the depth of the first part of the sub flow path can be increased while avoiding interference between the first part of the sub flow path and the solenoid valve. That is, in the valve device, the cross-sectional area of the flow path of the first part of the sub flow path can be ensured by the depth of the first part of the sub flow path. Accordingly, in the valve device, it is possible to prevent an increase in the size of the device in the width direction of the first part of the sub flow path, that is, the second direction.

Aspect 4

In the valve device according to any one of aspects 1 to 3, the flow path member includes a first flow path member having a recessed groove recessed downward in the up-down direction and a plurality of exposure holes penetrating in the up-down direction, and a second flow path member configured to cover the first flow path member from above in the up-down direction so as to close the recessed groove and the plurality of exposure holes, the flow path is formed by closing the recessed groove of the first flow path member with the second flow path member, and the plurality of solenoid valves face the second flow path member via the plurality of exposure holes in the up-down direction.

In the case of Comparative Example in which a first flow path member in which the plurality of exposure holes are not included is provided, the plurality of solenoid valves are disposed below the first flow path member. In this case, since the second flow path member cannot be disposed close to the plurality of solenoid valves in the up-down direction, a thickness of the device in the up-down direction is likely to increase. In contrast, in the valve device having the above-described configuration, the first flow path member includes a plurality of exposure holes from which the plurality of solenoid valves are respectively exposed. Therefore, in the valve device, the second flow path member can be disposed close to the plurality of solenoid valves in the up-down direction. As a result, in the valve device, an increase in the thickness of the device in the up-down direction can be further suppressed.

Aspect 5

In the valve device according to aspect 4, the second flow path member has a plate shape whose plate thickness direction is the up-down direction, and a gap is present between the second flow path member and the uppermost portions of the plurality of solenoid valves in the up-down direction.

Comparative Example in which the second flow path member comes into contact with the first flow path member and the uppermost portions of the plurality of solenoid valves in the up-down direction is considered. In the case of Comparative Example, the first flow path member may not sufficiently come into contact with the second flow path member while the uppermost portions of the plurality of solenoid valves may come into contact with the second flow path member due to the dimensional accuracy. That is, in the case of Comparative Example, the flow path may not be closed or the shape of the flow path may be deformed. In contrast, in the valve device having the above-described configuration, a gap is present between the second flow path member and the uppermost portions of the plurality of solenoid valves in the up-down direction. Accordingly, in the valve device, it is possible to prevent occurrence of a problem in the flow path due to contact between the second flow path member and the uppermost portions of the plurality of solenoid valves.

Aspect 6

In the valve device according to aspect 3, an interval between two of the solenoid valves adjacent to each other in the second direction becomes smaller as the two solenoid valves go downward in the up-down direction, and when a part forming the first part of the sub flow path between the two of the solenoid valves adjacent to each other in the second direction in the flow path member is defined as a first part forming portion, a width of the first part forming portion in the second direction becomes smaller as the first part forming portion goes downward in the up-down direction.

In the valve device, the first part forming portion can extend downward between two solenoid valves adjacent to each other in the second direction. In this respect, in the valve device, the depth of the sub flow path can be ensured.

Aspect 7

In the valve device according to aspect 6, the sub flow path has a bottom surface along a lower surface of the first part forming portion.

In the valve device, the depth of the sub flow path can be further ensured.

Aspect 8

In the valve device according to aspect 1 or 2, the flow path overlaps the uppermost portions of the plurality of solenoid valves when viewed from the direction perpendicular to the up-down direction.

In the valve device, an increase in the thickness of the device in the up-down direction can be prevented.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve device comprising:
   a flow path member having a flow path;
   a plurality of solenoid valves configured to open and close; and
   a support member configured to support the plurality of solenoid valves from below in an up-down direction and be stacked with the flow path member in the up-down direction, wherein
   when a part located at an uppermost position in the up-down direction of each of the solenoid valves is defined as an uppermost portion,
   the flow path is spaced from the uppermost portions of the plurality of solenoid valves in a direction perpendicular to the up-down direction,
   the flow path includes a main flow path and a plurality of sub flow paths that are connected to the main flow path and separately opened and closed by the plurality of solenoid valves,
   when the direction perpendicular to the up-down direction is defined as a first direction, and a direction perpendicular to both the up-down direction and the first direction is defined as a second direction,
   the plurality of sub flow paths each include a first part extending in the first direction, and
   the first parts of the plurality of sub flow paths are alternately aligned with the plurality of solenoid valves in the second direction.

2. The valve device according to claim 1, wherein the flow path extends in a direction intersecting the up-down direction, and a width of the flow path is smaller than a depth of the flow path.

3. The valve device according to claim 2, wherein the flow path member includes
   a first flow path member having a recessed groove recessed downward in the up-down direction and a plurality of exposure holes penetrating in the up-down direction, and
   a second flow path member configured to cover the first flow path member from above in the up-down direction so as to close the recessed groove and the plurality of exposure holes,
   the flow path is formed by closing the recessed groove of the first flow path member with the second flow path member, and
   the plurality of solenoid valves face the second flow path member via the plurality of exposure holes in the up-down direction.

4. The valve device according to claim 3, wherein the second flow path member has a plate shape whose plate thickness direction is the up-down direction, and a gap is present between the second flow path member and the uppermost portions of the plurality of solenoid valves in the up-down direction.

5. The valve device according to claim 2, wherein the flow path overlaps the uppermost portions of the plurality of solenoid valves when viewed from the direction perpendicular to the up-down direction.

6. The valve device according to claim 1, wherein the flow path member includes
   a first flow path member having a recessed groove recessed downward in the up-down direction and a plurality of exposure holes penetrating in the up-down direction, and
   a second flow path member configured to cover the first flow path member from above in the up-down direction so as to close the recessed groove and the plurality of exposure holes,
   the flow path is formed by closing the recessed groove of the first flow path member with the second flow path member, and
   the plurality of solenoid valves face the second flow path member via the plurality of exposure holes in the up-down direction.

7. The valve device according to claim 6, wherein the second flow path member has a plate shape whose plate thickness direction is the up-down direction, and a gap is present between the second flow path member and the uppermost portions of the plurality of solenoid valves in the up-down direction.

8. The valve device according to claim 1, wherein an interval between two of the solenoid valves adjacent to each other in the second direction becomes smaller as the two of the solenoid valves go downward in the up-down direction, and
   when a part forming the first part of a sub flow path between the two of the solenoid valves adjacent to each other in the second direction in the flow path member is defined as a first part forming portion,
   a width of the first part forming portion in the second direction becomes smaller as the first part forming portion goes downward in the up-down direction.

9. The valve device according to claim 8, wherein the sub flow path has a bottom surface along a lower surface of the first part forming portion.

10. The valve device according to claim 1, wherein the flow path overlaps the uppermost portions of the plurality of solenoid valves when viewed from the direction perpendicular to the up-down direction.

11. A valve device comprising:

a flow path member having a flow path;

a plurality of solenoid valves configured to open and close; and a support member configured to support the plurality of solenoid valves from below in an up-down direction and be stacked with the flow path member in the up-down direction, wherein when a part located at an uppermost position in the up-down direction of each of the solenoid valves is defined as an uppermost portion, the flow path is spaced from the uppermost portions of the plurality of solenoid valves in a direction perpendicular to the up-down direction, the flow path extends in a direction intersecting the up-down direction, a width of the flow path is smaller than a depth of the flow path, the flow path includes a main flow path and a plurality of sub flow paths that are connected to the main flow path and separately opened and closed by the plurality of solenoid valves, when the direction perpendicular to the up-down direction is defined as a first direction, and a direction perpendicular to both the up-down direction and the first direction is defined as a second direction, the plurality of sub flow paths each include a first part extending in the first direction, and the first parts of the plurality of sub flow paths are alternately aligned with the plurality of solenoid valves in the second direction.

12. The valve device according to claim 11, wherein an interval between two of the solenoid valves adjacent to each other in the second direction becomes smaller as the two of the solenoid valves go downward in the up-down direction, and when a part forming the first part of a sub flow path between the two of the solenoid valves adjacent to each other in the second direction in the flow path member is defined as a first part forming portion, a width of the first part forming portion in the second direction becomes smaller as the first part forming portion goes downward in the up-down direction.

13. The valve device according to claim 4, wherein the sub flow path has a bottom surface along a lower surface of the first part forming portion.

\* \* \* \* \*